US00RE40413E

(19) United States
(12) Reissued Patent
Despain et al.

(10) Patent Number: US RE40,413 E
(45) Date of Reissued Patent: Jul. 1, 2008

(54) METHOD AND APPARATUS FOR DEVELOPING A DYNAMIC SERVO SIGNAL FROM DATA

(75) Inventors: Alvin M. Despain, Los Angeles, CA (US); R. Stockton Gaines, Pacific Palisades, CA (US)

(73) Assignee: Purchased Patent Management LLC, Los Altos, CA (US)

(21) Appl. No.: 11/067,616
(22) Filed: Feb. 25, 2005

Related U.S. Patent Documents

Reissue of:
(64) Patent No.: 6,525,897
Issued: Feb. 25, 2003
Appl. No.: 09/991,669
Filed: Nov. 21, 2001

U.S. Applications:
(63) Continuation of application No. 09/187,770, filed on Nov. 6, 1998, now Pat. No. 6,381,088.

(51) Int. Cl.
*G11B 5/596* (2006.01)
*G11B 5/09* (2006.01)

(52) U.S. Cl. ..... 360/77.06; 360/53; 369/43
(58) Field of Classification Search ..... 360/77.06, 360/53; 369/43; *G11B 5/596*
See application file for complete search history.

(56) References Cited

U.S. PATENT DOCUMENTS 4,056,830 A * 11/1977 Smith
4,204,234 A * 5/1980 Noble
4,404,676 A * 9/1983 DeBenedictis (Continued)

FOREIGN PATENT DOCUMENTS

DE 39 00 683 A1 * 7/1990
DE 197 12 568 A1 * 1/1998
EP 0 298 475 A1 * 7/1988
EP 0 331 189 A2 * 3/1989
JP 61104358 * 5/1986
JP 04089654 * 3/1992
JP 08036811 * 2/1996
JP 10011844 * 1/1998
WO WO 99/36907 * 7/1999
WO PCT/US/99/26036 * 3/2000

OTHER PUBLICATIONS

L. N. He, et al., "Estimation of Track Misregistration by Using Dual–Stripe Magnetoresistive Heads," IEEE Transactions on Magnetics, vol. 34, No. 4, pp. 2348–2355, Jul. 1998.*

(Continued)

*Primary Examiner*—Andrea Wellington
*Assistant Examiner*—Dan I Davidson
(74) *Attorney, Agent, or Firm*—McDonnell Boehnen Hulbert & Berghoff LLP

(57) ABSTRACT

Apparatus using information about the extent of errors in sensed data for performing as a control function at least one of adjusting the position of a magnetic head to improve alignment relative to a track and selecting from two or more data signals a data signal having the least amount of errors is shown. The apparatus uses information about the extent of errors to perform a control function for reproducing the data stored in predetermined storage locations in a storage media. The apparatus positions a transducer for sensing from predetermined storage locations stored data containing at least one constraint. The transducer generates a first signal representative of the data containing at least one constraint stored in the sensed data and any errors introduced into the sensed data during the sensing. An input device, preferably in the form of a detector is responsive to the first signal for generating a control signal containing information about the extent of errors in the sensed data and for extracting a data signal. The control signal is used for performing the above control functions. A method for using information about the extent of errors for a control function to improve the extracted data stored at the predetermined storage locations is also shown.

53 Claims, 8 Drawing Sheets

U.S. PATENT DOCUMENTS

| | | | | | |
|---|---|---|---|---|---|
| 4,445,153 | A | * | 4/1984 | Fujimoto et al. | |
| 4,499,510 | A | * | 2/1985 | Harding et al. | |
| 4,563,713 | A | * | 1/1986 | Cahoon et al. | |
| 4,642,709 | A | * | 2/1987 | Vinal | |
| 4,701,815 | A | * | 10/1987 | Yada et al. | |
| 4,772,963 | A | * | 9/1988 | Van Lahr et al. | |
| 4,816,938 | A | * | 3/1989 | Cowen et al. | |
| 4,816,947 | A | * | 3/1989 | Vinal et al. | |
| 4,890,172 | A | * | 12/1989 | Watt et al. | |
| 4,920,442 | A | * | 4/1990 | Dimmick | |
| 4,924,160 | A | * | 5/1990 | Tung | |
| 5,073,834 | A | * | 12/1991 | Best et al. | |
| 5,163,162 | A | * | 11/1992 | Berry et al. | 369/43 |
| 5,189,572 | A | * | 2/1993 | Gooch | |
| 5,233,487 | A | * | 8/1993 | Christensen et al. | |
| 5,490,091 | A | * | 2/1996 | Kogan et al. | |
| 5,499,232 | A | * | 3/1996 | Hardwick | |
| 5,523,902 | A | * | 6/1996 | Pederson | |
| 5,541,783 | A | * | 7/1996 | Yamamoto et al. | |
| 5,585,975 | A | * | 12/1996 | Bliss | |
| 5,668,678 | A | * | 9/1997 | Reed et al. | |
| 5,677,809 | A | * | 10/1997 | Kadlec | |
| 5,717,538 | A | * | 2/1998 | Cheung et al. | |
| 5,724,205 | A | * | 3/1998 | Choi | |
| 5,754,353 | A | * | 5/1998 | Behrens et al. | |
| 5,796,543 | A | * | 8/1998 | Ton-That | |
| 5,825,579 | A | * | 10/1998 | Cheung et al. | |
| 5,841,601 | A | * | 11/1998 | Fisher | |
| 5,847,894 | A | * | 12/1998 | Blank et al. | |
| 5,909,661 | A | * | 6/1999 | Abramovitch et al. | |
| 5,930,448 | A | * | 7/1999 | Lee et al. | |
| 5,938,790 | A | * | 8/1999 | Marrow | |
| 5,946,156 | A | * | 8/1999 | Schwarz et al. | |
| 5,949,603 | A | * | 9/1999 | Brown et al. | |
| 5,949,605 | A | * | 9/1999 | Lee et al. | |
| 5,961,658 | A | * | 10/1999 | Reed et al. | |
| 6,157,510 | A | * | 12/2000 | Schreck et al. | 360/77.06 |

OTHER PUBLICATIONS

G. F. Franklin, et al., "Design of a Disk Drive Servo: A Case Study," Digital Control of Dynamic Systems 3rd Edition, pp. 649–689, 1998.*

E. Grochowski, et al., "Future Trends In Hard Disk Drives," IEEE Transactions on Magnetics, vol. 32, pp. 1850–1854, 1996.*

S. E. Baek, "Design of a Multi–Rate Estimator And Its Application to a Disk Drive Servo System," Proc. Amer. Contr. Conf., San Diego, CA, pp. 3640–3644, Jun. 1999.*

X. Hu, et al., "Discrete–Time LQG/LTR Dual–Stage Controller Design And Implementation For High Track Density HDDs," Proc. Amer. Contr. Conf., San Diego, CA, pp. 4111–4115, Jun. 1999.*

S. Hara, et al., "Two–Degree–of–Freedom Controllers For Hard Disk Drives With Novel Reference Signal Generation", Proc. Amer. Contr. Conf., San Diego, CA, pp. 4132–4136, Jun. 1999.*

M. T. White, et al., "Rejection of Disk Drive Vibration And Shock Disturbances Observer," Proc. Amer. Contr. Conf., San Diego, CA, pp. 4127–4131, Jun. 1999.*

D. Hernandez, "Dual–Stage Track–Following Servo Design For Hard Disk Drives," Proc. Amer. Contr. Conf., San Diego, CA, pp. 4116–4121, Jun. 1999.*

J. Li, et al., "Rejection of Repeatable And Non–Repeatable Disturbances For Disk Drive Actuators," Proc. Amer. Contr. Conf., San Diego, CA, pp. 3615–3619, Jun. 1999.*

Y. Huang, et al., "Robustnes Analysis on a High Bandwidth Disk Drive Servo System With an Instrumental Suspension," Proc. Amer. Contr. Conf., San Diego, CA, pp. 3620–3624, Jun. 1999.*

Y. Huang, et al., "A Novel Disturbance Observer Design For Magnetic Hard Drive Servo System With a Rotary Actuator," IEEE Transactions on Magnetics, vol. 34, No. 4, pp. 1892–1894, Jul. 1998.*

Y. Mizoshita, et al., "Vibration Minimized Access Control For Disk Drives," IEEE Transactions on Magnetics, vol. 32, No. 3, pp. 1793–1798, May 1996.*

L. S. Fan, et al., "Magnetic Recording Head Positioning at Very High Track Densities Using a Microactuator–Based, Two–Stage Servo System," IEEE Transactions on Industrial Electronics, vol. 42, No. 3, pp. 222–223, Jun. 1995.*

W. Guo, et al., "A High Bandwidth Piezoelectric Suspension For High Track Density Magnetic Data Storage Devices," IEEE Transactions on Magnetics, vol. 34, No. 4, pp. 1907–1909, Jul. 1998,*

S. Koganezawa, et al., "Dual–Stage Actuator System For Magnetic Disk Drives Using a Shear Mode Piezoelectric Microactuator," IEEE Transactions on Magnetics, vol. 35, No. 2, pp. 988–992, Mar. 1999.*

K. Mori, et al., "A Dual–Stage Magnetic Disk Drive Actuator Using a Piezoelectric Device For a High Track Density," IEEE Transactions on Magnetics, vol. 27, No. 6, pp. 5298–5300, Nov. 1991.*

K. K. Chew, "Control System Challenges to High Track Density Magnetic Disk Storage," IEEE Transactions on Magnetics, vol. 32, No. 3, pp. 1799–1804, May 1996.*

L. Guo, "Reducing The Manufacturing Costs Associated With Hard Disk Drives—A New Disturbance Rejection Control Scheme," IEEE/ASME Transactions on Mechatronics, vol. 2, No. 2, pp. 77–85, Jun. 1997.*

S. Finch, et al., "Headerless Disk Formatting: Making Room For More Data," Data Storage, pp. 51–54, Apr. 1997.*

S. R. Hetzler, "No–ID Sector Format," IBM Storage, pp. 1–3 Jan. 8, 1996.*

L.N. He, et al., "Estimation of Track Misregistration by Using Dual–Stripe Magnetoresistive Heads," IEEE Transactions on Magnetics, vol. 34, No. 4, pp. 2348–2355, Jul. 1998.*

IBM Research, "The Giant Magnetoresistive Head: A Giant Leap for IBM Research," http://www.research.ibm.com/research/gmr.html, pp. 1–2, Aug. 21, 1998.*

* cited by examiner

METHOD AND APPARATUS FOR DEVELOPING A DYNAMIC SERVO SIGNAL FROM DATA

Matter enclosed in heavy brackets [ ] appears in the original patent but forms no part of this reissue specification; matter printed in italics indicates the additions made by reissue.

"This is a continuation of application Ser. No. 09/187,770, filed Nov. 6, 1998, now U.S. Pat. No. 6,381,088, allowed, the disclosure of which is hereby incorporated by reference in its entirety."

BACKGROUND OF THE INVENTION

1. Field of the Invention

The invention relates generally to using information about errors for improving extracted data sensed from stored data and more specifically relates to apparatus for using information about the extent of errors wherein a transducer is used to sense stored data having at least one constraint from predetermined storage locations. The transducer generates a signal containing at least one constraint and any errors introduced into the sensed data during the sensing. An input device, which in the preferred embodiment is a detector, is responsive to the signal from the sensor to generate a control signal containing information about the extent of errors and extracts a data signal. An output device is responsive to the control signal to perform a control function to effectively improve the extracted data signal as a function of the extent of errors in the sensed data. In addition, the transducer may have at least two sensors or two transducers may be used to produce a first signal and second signal which is applied to the input device to extract a first data signal and a second data signal wherein the output device is responsive to the control signal and to the first data signal and second data signal to derive a data signal therefrom having [the least number of] *fewer* errors.

The apparatus accomplishes this control function by: (i) using the control signal to produce a dynamic servo signal, which in the preferred embodiment is in the form of a substantially continuous servo signal, to adjust a transducer or transducers position to improve alignment of the first transducer relative to predetermined storage locations, which in the preferred embodiment is a track; (ii) deriving, from data signals extracted from signals sensed from two or more transducers or sensors, a data signal having [the least number of] *fewer* errors; or (iii) a combination of producing a dynamic servo signal and deriving a data signal having the east number of errors.

In the preferred embodiment, the input device or detector generates a position error signal from the signal received from the transducer and that position error signal is used as a servo signal for adjusting the transducer position to improve alignment of the transducer relative to the predetermined storage locations.

This invention also relates t a method for using information about errors for performing a control function to improve the extracted data from the stored data in the predetermined storage locations as a function of the extent of errors in the sensed data.

In the preferred embodiment, the invention relates to the field of reading or reproducing from and writing data to mass storage devices, such as magnetic discs.

Also, in the preferred embodiment, the apparatus and method improves the extracted data that is read or reproduced by deriving from among two or more data signals by deriving therefrom the data signal having [the least number of] *fewer* errors, or from a combination thereof. This invention is based on the principle that when at least one constraint is added to the data, this constitutes prior knowledge of the expected data signal in the absence of noise or other impairments. Such knowledge can be exploited, such as for example, by making a computation or comparison between the expected data signal including the at least one constraint and the observed data signal including the at least one constraint, to develop a control signal representing the extent of errors introduced into the signal sensed from the predetermined storage locations by the transducer, transducers or sensors. The so developed control signal can be used to develop a dynamic servo signal in the form of a substantially continuous position error signal which is use to improve head/track alignment using conventional apparatus and methods.

In another embodiment of this invention, by reading and calculating the position error signal on a substantially continuous basis, an effective servo sampling rate is achieved that is much higher than the sampling rates of the state-of-the art apparatus and method.

In the writing mode using a magnetic head, the recorded data is read and the head position is adjusted using the servo system up to the instant the head begins to write thereby improving the quality of the written data on a track.

In yet another embodiment of the present invention, the magnetic head or transducer may contain more than one read sensor. By using the teachings of this invention, the signal representing the extent of errors ay be used to derive a data signal containing [the least number of] *fewer* errors from the more than one data signals.

In a further embodiment of this invention, deriving the data signal which contains [the least number of] *fewer* errors and adjusting the head position to improve alignment with the predetermined storage locations in response to a control signal representing the extent of information about errors may be used in combination to improve the extracted data signal.

2. Description of the Prior Art

It is well known in the art t at magnetic discs operate by providing a surface capable of being magnetized in individualized storage locations or in predetermined storage locations. One or more read/write heads are used for interacting with or transducing with the predetermined storage locations for sensing data store at the predetermined storage locations. The magnetized surface is rotated at relatively high speed, thus presenting each predetermined storage location on the surface to the read/write heads or transducers. The use of and operation of transducers for recording and reproducing data from predetermined storage locations from mass storage devices, such as for example a rotating magnetic disc memory s stem, optical memories, magnetic tape and the like is well known in the art.

It is also known in the art to record or store at predetermined storage locations data or information on rotating surfaces, such as for example, magnetic discs and optical discs. The term "predetermined storage cations" as used herein means the individualized area on a surface, such as for example a predetermined or addressable location on a treated surface area in a rotating memory storage device, which contains or stores data or information. In a rotating memory storage device, which utilizes magnetic media as a magnetic recording surface, the data or information is stored as a series of magnetic field transitions on the magnetic recording surface. Such series of magnetic transitions are included in the term "predetermined storage locations". The predetermined storage locations are generally recorded or stored in tracks on magnetic media.

Data is read from the predetermined storage locations on the magnetic media using a transducer that interacts with the recording media as a write transducer interacted with the magnetic media when the data or information was recorded or stored. In reading or sensing previously written data from a discrete storage location, the transducer, which functions as a read sensor, must be positioned over or aligned with the tracks on the recording surface where the writing transducer has written or stored the data. Typically, th width allocated to a track of recorded or stored data is wider than the width of the actually recorded predetermined storage locations. Further, the width of the sensor used for reading or sensing the stored data has a width that is less than the width of both the track and of the discrete storage location.

In magnetic discs, data is generally disposed on generally circular tracks, each on the surface of the disc and oriented with its center coaxial with the physical disc. The read/write heads, sometimes referred to as read/write transducers, are disposed in a head/arm assembly so as to be adapted to be moved to a selected track, under control of a disc servo controller.

The state-of-the-art rotating memory systems store as much data as possible on the magnetic disc. This, in turn, requires that the individuated locations or predetermined storage locations of data or information be as small as possible. Further this requires that the tracks on the magnetic media be as close together as possible.

The sensor or transducer for sensing or reading the stored data from predetermined storage locations on magnetic media must be positioned in alignment with the track during the sensing or reading process. The sensors or transducers are operatively connected to arm assemblies, which are sometimes called head/arm assemblies in rotating magnetic disc storage systems, which are adjustable to cause the sensor or transducer to be positioned within the width of the predetermined storage locations containing the stored or written data. If the transducer is positioned within the width of the discrete storage location, the transducer is in precise alignment with the predetermined storage locations and senses or reads the stored data to produce a signal from the sensor with the optimum signal-to-noise ratio and with low data errors.

It is known in the art that, as the track density increases, it becomes more difficult to precisely align the read/write heads or sensors with the tracks. Such misalignments or variances in alignment may occur during reading and writing of data due to variances in operating conditions. The read/write heads or sensors may vary from precise alignment with the tracks by any one of: (i) horizontal displacement from the actual track, (ii) angular orientation or skewing relative to the actual track, or (iii) vertical displacement from the actual track due to the read/write heads or sensor lifting off of the disc. As a result of any of the above variances in operating conditions, the read/write heads or sensor may not precisely be aligned with the track, and such misalignment or variances in alignment change with time.

As a result of such misalignment, the transducing operation of the read/write head or sensors in reading or recovering data from the predetermined storage locations becomes degraded. In addition, the sensed data contains errors or the data sensed by the sensor becomes deformed which results in errors in the electrical signal representing the data or information.

Typically, the transducers were positioned over the rotating magnetic media. Initially, steppe motors were used as actuators to move the sensors to a specific position and the sensors remained in that position during reading and writing of data. This is referred to herein as the "Stepper Motor Method"

One disc drive system which used a process for determining the center of data disc tracks is disclosed in U.S. Pat. No. 4,816,938. In U.S. Pat. No. 4,816,938, a transducer head is positioned to one side of a track. The transducer head repeatedly reads the track and is microstepped across the track. The number of microsteps taken at the position on each side of the center of the rack, where a certain number of error corrections occur, are designated as the boundaries of that track. The center of the track is then calculated as being half-way between the boundaries. By using the microstep off-sets for the centers of two tracks, a correction factor can be calculated to compensate for thermal expansion of the disc.

Another method known in the art for controlling transducer head/track alignment is to use a closed loop servo system having a dedicated servo surface. In this method, continuous sequences of special positioning signals were recorded on the servo surface in every track on the servo surface. Deviation signals were developed using the prerecorded sequences and such deviation signals were used in a feedback technique to adjust the position of all of the other read/write transducer heads. This is referred to herein as the "Servo Surface Method"

Another known method includes "servo bursts" being prerecorded around each track to improve the alignment of the data head with the data track. A "servo burst" is a short special position signal, i.e., equivalent to the length of few bits, prerecorded in each track, used in a servo system for maintaining head/track alignment.

The prerecorded "servo burst" pattern is presently used for generating a signal indicating the magnitude of misalignment between the data head and track an the direction that the head was displaced from the track center. Special cases provide for prerecording a "servo burst" in each sector of a disc. The so generated signal is used to locate track position more precisely in terms of predefined actuator positions and functioned to place the head in alignment with the track.

The recorded servo bursts are used to provide an open loop servo system to more accurately and rapidly position a head relative to a track prior to reading of and writing of data onto and from the track and to adjust or correct head position during the process of reading and writing of data. This is referred to herein as the "Servo Burst Method".

U.S. Pat. No. 5,233,487 discloses a rotating media storage system that compensates for thermal and mechanical errors in the position of the data detector, or read head, with respect to the written data. The compensation is accomplished by measuring the error rate of written data as a function of the read offset of the detector in that error rates become increasingly large as the sensed noise to signal ratio becomes large. As the offset of the head becomes misaligned with the track, the sensed noise to signal ratio increases. When the data storage system is initially activated, the detector counts the number of errors detected in reading written data for various read offsets. When the number of errors reaches a target rate, the read offset corresponding to the target rate is saved. The procedure is performed on either side of the data track. During operation of the storage system, thermal and mechanical operational errors occur in the system and similar error rate data and offset data are developed for these operational conditions. The so developed error rate and target error rate are used to cause the detector to be re-centered with respect to the write transducer position between the new offsets on either side of the tracks.

Use of a dual-striped magnet resistive head with a conventional servo system was disclosed in an article entitled Estimation of Track Misregistration by Using Dual-Stripe Magnetoresistive Heads, by Lian N Zhi Gang Wang, Desmond J. Mapps, P. Robinson, Warwick W. Cleg , D. T. Wilton and Yoshihisa Nakamura, which appeared at Pages 2348 to 2355 of the IEEE TRANSACTIONS ON MAGNETICS, Volume 34, No. Jul. 4, 1998 (the "Wang et al Reference"). The Wang et al Reference utilized the principal that when a dual-stripe, unshielded magnetoresistive ("MR") element is exposed to the same stray field from a media transition, one MR element has a resistance increase and the other MR element has a resistance decrease. The difference between the MR element's output envelopes was demodulated by a peak value detection circuit and the sum of the two element signals was considered as a position error signal. The position error signal was utilized in conjunction with a conventional servo system and the estimated off track perturbation was used to supplement the well used sector servo. This system did not use a constraint within the data or the Extent of errors therein.

U.S. Pat. No. 4,404,676 discloses a method using a data-dependent code word consisting of redundancy bits, that marks a boundary of a multi-bit cell. The data-dependent code word is coded to bear a "mapping relationship" to a data block within the cell. Embodiments using the data-dependent code word provide various types of synchronization. Decoders provide block and bit synchronization for either serial-by-bit data signal or a serial-by-byte data signal. U.S. Pat. No. 4,404,676 further discloses that the preferred embodiment is used in a record/playback system for storing on a storage medium and subsequently deriving the stored information from the storage medium. In the system disclosed in U.S. Pat. No. 4,404,676, encoding means and decoding means are used, each of which utilizes a data-dependent boundary-marking code word bearing a predetermined mapping relationship to a data block of a cell and otherwise being indistinguishable from arbitrarily selected groups of data bits. The object of U.S. Pat. No. 4,404,676 is to solve synchronization problems and not to provide for adjusting head or transducer position or deriving a data signal having the least amount of errors from two or more data signals representing the sensed data.

As is well known in the art, a servo system in rotating memory systems is used to control the positioning of the sensor relative to the tracks of predetermined storage locations containing the stored data. Servo systems, which are well known in the art, include sector servo systems, dedicated servo systems or other well known servo systems. The function of the servo system is to compare certain sensed signals with a predetermined pattern of signals and to use the results of such a comparison to change position of the sensor or transducer with respect to the predetermined storage locations to generate the most accurate reading of the stored data from the predetermined storage locations.

The known prior art servo systems and methods for sensing and providing efficient and rapid adjustments of the sensing head have many disadvantages.

In the Stepper Motor Method, no feedback signals were used to adjust head position.

In the system and method disclosed in U.S. Pat. No. 4,816,938 reading of the data or writing of new data must occur in an open loop system, e.g. no servo loops are used, during reading and writing of the data. Error correction codes were used only to help select transducer head position prior to reading or writing of the data.

With respect to the Servo Surface Method as discussed hereinbefore, while this method partially achieves the goal of attempting to align the read/write head with the data track, it has at least the following drawbacks. First, this method uses substantial disc space for the servo sequences, which removes area from the disc that could otherwise be used for data. Second, the Servo Surface Method results in misalignment between the servo head and the data head and is not practical for use in magnetic disc drives having higher areal densities. While the Servo Surface Method as augmented by U.S. Pat. No. 5,233,487 provides a correction for changes in the relation between the servo surface head and data head due to thermal expansion and other factors, servoing during data reading and writing is restricted to the servo surface.

The Servo Burst Method as described above is an intermittent servo system that runs open loop between servo bursts and closed loop upon the sensing of the recorded servo burst to produce servo signals for adjusting the head position relative to the data track. The Servo Burst Method is generally known in the industry as open loop technology and is the standard today of the industry for magnetic storage systems. This method, even as augmented by U.S. Pat. No. 5,23,487 and the Wang et al reference, has at least the following drawbacks.

First, if it is desired to improve the sampling accuracy, additional disc space for the servo bursts would be required. Second, the accuracy of this method must be significantly improved upon for use in the state-of-the art high areal density storage systems The method disclosed in U.S. Pat. No. 5,233,487 is based on the principal that sensing signals outside of the write width is deemed an off-track read, and when enough of the read widths are outside of the write width, an error in reading data is deemed to have occurred. An ECC detection/correction means senses the error in blocks of data and a counter maintains a count of the number of errors. When the errors reach a predetermined error rate, the data detector position is adjusted to optimize detector read performance. As such, adjustment of the read head relative to the data track occurs only after the number of counted errors exceeds a predetermined number of errors.

The use of a dual-stripe MR head, as disclosed in the Wang et al Reference, was based on the principal that the signal waveform changes only in amplitude as the head moves off track, and does not rely on the data signal having any constraints.

The system and method disclosed in U.S. Pat. No. 4,404,676 has several limitations when applied to magnetic data storage systems. During reproduction of the data in such a system, it is necessary to produce a plurality of individually identifiable clock signals and each clock signal has reoccurring clock pulses with the clock pulses of each such clock signal differing from those of each other clock pulses as to the time of occurrence. The block pulses are required to sample a data signal and to derive a plurality of sample bits that are congregated and tested. The system includes means for generating a candidate-valid signal for each candidate cell that is determined, by such testing, to be a valid cell. As each candidate cell undergoes such testing, that testing determines whether the code-word portion of the candidate cell bears the predetermined mapping relationship to its block-length portion as is characteristic of a valid cell. Since this system is based on a serial-by-bit data signal or a serial-by-byte data signal method, the system is not designed and is unable to produce a position error signal, or to derive a signal from among multiple input signals.

In the last several years, the state-of-the art performance benchmark for the magnetic hard disc drive industry has been areal density progression. Areal density is defined as the number of bits per square inch that can be stored on a magnetic disc surface and successfully retrieved. Areal density is determined mathematically by Bits Per Inch ("BPI") multiplied by Tracks Per Inch ("TPI") (BPI×TPI). As the areal density increases, the need for an improved head positioning apparatus, methods and systems likewise becomes necessary due to the limitations of the prior art systems, methods and apparatus as described above.

Areal density for magnetic hard disc drives has been increasing at a 60% compounded annual growth rate and that rate is forecasted to continue for at least the next several years. For example, the areal density for magnetic hard disc drives was 1 gigabit per square inch ("Gb/sq. in.") in 1995 and increased to 4.1 Gb/sq. in. in 1998.

In addition, it is reasonable to expect that at some areal density point, which is presently estimated at about 40 Gb/sq. in., the issue of thermal decay of the stored data on the magnetic media will need to be addressed. It is reasonable to conclude that other storage media, such as for example, chemical and molecular media, may be developed for storage of data in predetermined storage locations.

Increases in TPI will probably depend on the ability of the read head or read transducer to both track the data and to respond mechanically to non-repeatable spindle motor problems and other track misregistration problems.

In 1998, typical BPI is 256,000 and TPI is 16,000 which represent an areal density of about 4.1 Gb/sq. in. For the year 2000, the areal density is forecast to be 10 Gb/sq. in. which corresponds to a BPI of 334,000 and a TPI of 30,000.

It is reasonable to conclude that a track density may exceed 86,000 TPI and, if so, the read head or read sensor will have to follow a written track width of 10 microinches, all of which will require advanced servo systems and data track following technology utilizing the teachings of the present invention.

SUMMARY OF THE PRESENT INVENTION

The present invention discloses a new, novel and unique apparatus for using information about the extent of errors. The apparatus includes a first transducer positioned for sensing predetermined storage locations and generating a first signal representative of data containing at least one constraint from the predetermined storage locations and any errors introduced into the sensed data during the sensing. The apparatus includes an input device responsive to the first signal for generating a control signal containing information about the extent of errors in the sensed data and for extracting a data signal. An output device is operatively coupled to the input device for receiving the control signal and for performing a control function in response thereto to improve the extracted data signal as a function of the extent of errors in the sensed data.

The output device may be responsive to the control signal to produce a dynamic servo signal, which may be in the form of substantially continuous servo signals which are used to improve alignment of the first transducer relative to the predetermined storage locations. In the preferred embodiment the dynamic servo signal may be used to generate position error signals for head/track alignment in a magnetic disc drive storage system.

Information about the extent of errors is developed on a continual basis and is not delayed until a threshold condition of errors is exceeded.

This may take the form of an adjusting element operatively coupled to the first transducer for receiving and responding to information about the extent of errors in the control signal and for adjusting the transducer in a direction to position the transducer in improved alignment relative to the predetermined storage locations.

The apparatus may include a second transducer positioned relative to the first transducer for sensing the predetermined storage locations and generating a second signal representative of data containing at least one constraint from the predetermined storage locations and any errors introduced into the sensed data during the sensing. In this apparatus, the input device generates the control signal from at least one of the first signal and the second signal and extracts a first data signal and a second data signal and the output device is responsive to the control signal and at least one of the first data signal and the second data signal to derive therefrom a data signal containing the least amount of errors.

In another embodiment, the apparatus includes a first transducer having at least two sensors for concurrently sensing the predetermined storage locations and generating a first signal and a second signal each representative of the data containing the at least one constraint from the predetermined storage locations and any errors introduced into the sensed data during the sensing. The input device generates the control signal from at least one of the first signal and the second signal and extracts a first data signal and a second data signal. The output device is responsive to the control signal and at least one of the first data signal and the second data signal to derive by selection therefrom a data signal containing the least amount of errors.

In addition, this invention includes a new, novel and unique method for using information about the extent of errors. The method comprises the steps of: (a) positioning a first transducer for sensing predetermined storage locations storing data containing at least one constraint and generating a first signal representative of the data containing at least one constraint from the predetermined storage locations and any errors introduced into the sensed data during the sensing; (b) generating in response to the first signal a control signal containing information about the extent of errors in the sensed data and extracting a data signal; and (c) receiving the control signal and performing in response thereto a control function to improve the extracted data signal as a function of the extent of errors.

The method also includes the step of receiving being responsive to the control signal and the first data signal and the second data signal for deriving a data signal therefrom containing the least amount of errors.

The method also includes in the step of responding by adjusting the position of a transducer with an adjusting element operatively coupled thereto for receiving and responding to information about the extent of errors in the control signal wherein the transducer is adjusted in a direction to position the transducer in improved alignment with the predetermined storage locations.

The present invention also includes a storage system comprising a storage media, which may be a two dimensional surface or a three dimensional volume such as a holographic memory. The storage system comprises a storage media having located thereon predetermined storage locations storing data containing at least one constraint. A transducer is positioned relative to the storage media for sensing the data containing the at least one constraint stored in the predetermined storage locations and generates a first signal representative of the sensed data containing the at least one constraint and any errors introduced into the sensed data during the sensing. An input device is responsive to the first signal for generating a control signal containing information about the extent of errors in the sensed data and for extracting a data signal. An output device is operatively coupled to the input device for receiving the control signal and for performing a control function in response thereto to improve the extracted data signal as a function of the extent of errors in the sensed data stored as data in the predetermined storage locations.

The output device may be an adjusting element operatively coupled to the transducer for receiving and responding to information about the extent of errors in the control signal and for adjusting the transducer in a direction to position the transducer in improved alignment relative to the predetermined storage locations.

In another embodiment, a detection apparatus comprises a first transducer that is movably positioned for sensing stored data containing at least one constraint. The first transducer generates a first signal representative of sensed data containing at least one constraint stored as stored data and any errors introduced into the sensed data during the sensing. A detector is responsive to the first signal for producing a control signal containing information about the extent of errors in the sensed data and extracting a data signal. The output device is operatively coupled to the detector for receiving the control signal and for performing a control function in response thereto to improve the extracted data from the stored data as a function of the extent of errors in the sensed data.

A method is also taught herein for using information about the extent of errors in combination with servo burst signals generated from prerecorded servo bursts.

Therefore, one advantage of the present invention is that a novel, unique and improved apparatus, method, and system is provided for aligning sensors, e.g. disc read/write heads, in an information storage system e.g. a magnetic hard disc drive system or magnetic floppy disc drive system.

Another advantage of the present invention is that disc read/write heads are dynamically aligned with data tracks in response to a control signal containing information about the extent of errors as detected from data generated by the read/write heads with regard to the data containing at least one constraint itself.

A further advantage of the present invention is that the sensed data itself provides substantially continuous feedback of signals containing information about the extent of errors to an actuator for the read/write heads. The information about the extent of errors also provides sufficient information to align the read/write heads with data tracks even when the signal amplitude is not significantly altered or distorted.

A further advantage of the present invention is that the information about the extent of errors is developed on a current basis and the control signal containing information about the extent of errors are generated at the microsecond level.

A still further advantage of the present invention is that information about the extent of errors may be used to derive, e.g. select, one of a plurality of sequences of data, such sequences extracted from a corresponding plurality of sensors, e.g., multiple sensors such as magnetoresistive elements disposed on a read/write head.

A still further advantage of the present invention is that the information about the extent of errors can be determined in response to constraints on the data signals as sensed, which constraints are implicit in or included in the data signals as recorded. Such constraints can include error detecting or correcting codes, Partial Response Maximum Likelihood ("PRML") encoding, Run Length Limiting ("RLL") codes, or other bit encoding techniques, data formatting, waveform shaping or other information regarding the consistency of data signals as recorded and later sensed.

A still further advantage of the present invention is that the apparatus for producing the control signal can be used to generate substantially continuous feedback of signals containing information about the extent of errors in nearly real time and applying the same to an actuator for positioning the read/write heads to maintain head/track alignment in combination with the Servo Burst Method as described above such that the position error signals from the apparatus are used during the intervals between servo bursts and, at the time of sensing of a recorded servo burst that servo burst signal is used to produce servo signals for adjusting the head position relative to the data track.

A still yet further advantage of the present invention is that the apparatus for producing the control signal containing information about the extent of errors which can be used to generate a dynamic servo signal in the form of a substantially continuous position error signal at a sampling rates substantially higher than the rate that servo signals can be generated by the Servo Burst Method as described above such that the position error signals may be used for adjusting the head position relative to the data track at substantially higher rates than the present state-of-the-art Systems and apparatus.

BRIEF DESCRIPTION OF THE DRAWINGS

The foregoing and other advantages of this invention will be apparent from the following description of the preferred embodiment of the invention when considered with the illustrations and accompanying drawings which include the following Figures.

DESCRIPTION OF THE PREFERRED EMBODIMENT

Figure 1:
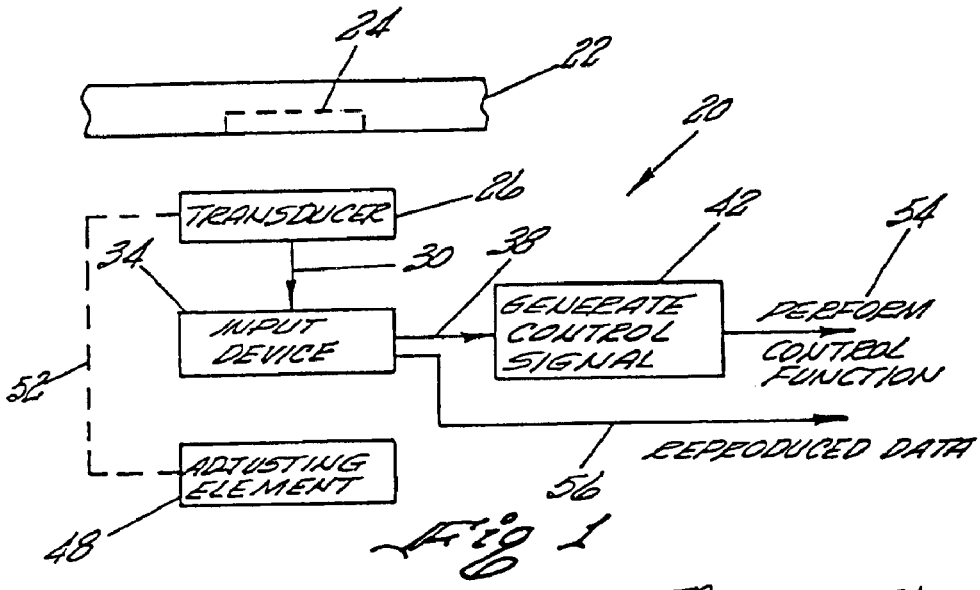
FIG. 1 is a pictorial representation of a treated surface of a storage media containing predetermined storage locations containing data and includes a partial block diagram of a transducer, an input device, a device for generating a control signal and an adjusting element comprising apparatus for using information about the extent of errors sensed by a transducer from predetermined storage locations.

In order to better understand the teachings of the present invention, to set forth certain definitions that apply to the disclosure and claims as set forth herein and to provide other technical information and data, the following is provided as background for this invention.

Background

The word "derive" as used herein means to perform one or more logical processing operations on one or more original electrical signals resulting in a different but related secondary signal based on or taken from one or more of the original electrical signals subject of a logical processing operation resulting in a derivation of one or more of the original electrical signals. For example, a derivation of an output signal from a first data signal and a second data signal with a control signal can be accomplished several ways. The simplest derivation, known as a "selection", is to select, by means of a control signal, between the first data signal and the second data signal the data signal that corresponds to [the least number of] *fewer* errors averaged over an appropriate interval as the logical operation. Another example of a derivation is an output signal from a first data signal and a second data signal generated by forming a weighted average of the first data signal and the second data signal, as a logical operation, with the weights determined by means of a control signal so as to produce an output signal of [the least number of] *fewer* errors. Other derivations are well known to those skilled in the art of deriving an improved data output signal from several sensed signals of the same stored data.

A "flexure" is a flexible loading device that supports a head/slider assembly and is operatively mounted at the end of a loading arm in a head stack assembly.

A "head" is a fabricated device, which typically is in the form of a microchip, that contains one or more transducers or sensors or transducers having elements that function as read and/or write elements.

A "head/slider" is a fabricated element comprising a head and slider that is mounted onto a flexure for loading onto a rotating surface.

A "head/arm assembly" is an arm containing flexures and a head/slider assembly located at one end thereof. The end of the loading arm supporting the head/slider assembly may be articulated.

A holographic memory is a memory in which information or data is stored in the form of holographic images in photographic emulsion or other recording media.

A "position error signal" is a signal representing that a disc head is off track, and the magnitude and direction thereof; and the processing of this signal results in an adjustment of or repositioning of the head relative to predetermined storage locations by an actuator.

A "PRML" is an acronym for "partial response maximum likelihood" that is a method of generating and decoding the analog signal that records data at predetermined storage locations such as along a data track.

A "sensor" is a device for reading or reproducing information stored on a recording media such as for example, an inductive magnet, magnetoresistive ("MR") element, an optical detector, e.g. charged coupled device ("CCD"), for responding to information stored on an optical storage medium.

A "slider" is a device that supports the head and forms an air bearing between the head and rotating surface to keep the head flying over the rotating surface, which typically is a magnetic disc, at the correct height and carries the electrical leads from the head to the flexure.

A storage medium is a storage device which may be a two dimensional medium such as a magnetic tape, rotating magnetic memory, an optical disc or a three dimensional medium such as a holographic memory.

A "transducer" is a device for interacting with a treated surface for recording and reproducing information on the treated surface. As used herein, the term "transducer" is intended to cover an inductive head, a write transducer, magnetoresistive elements, read transducers, lasers, optical sensors, microphones, CCD devices and the like. Sometimes the term "sensor" is used interchangeably with the term "transducer", and in the context of this invention, a sensor is a read element or read transducer.

Chart I set forth below is a listing of actual head and disc drive parameters for the years 1997 and 1998 and of the forecasted parameters for the future showing the head technology and disc drives in which the present invention has utility:

CHART I

| Year | Areal Density (Gb/sq in) | KTPI | KBPI | Read Track Width (Microinches) | Head Technology |
|---|---|---|---|---|---|
| 1997 | 2.64 | 12.5 | 201 | 54 | MR |
| 1998 | 4.10 | 16.0 | 256 | 42 | MR, GMR |
| 2000 | 10.00 | 30.0 | 334 | 22 | GMR |
| 2003 | 40.00 | 61.0 | 659 | 17 | GMRT |
| 2005 | 80.00 | 86.0 | 926 | 8 | GMRT |

Note:
MR is a magnetoresistive head.
GMR is giant magnetoresistive head wherein the sensor is formed of a material that utilizes spin-dependent scattering of electrons for sensing data stored at the predetermined storage electrons, an example of which is set forth in the IBM RESEARCH BULLETIN dated Aug. 21, 1998 and as shown at the IBM Website www.research.ibm.com.
GMRT is an advanced giant magnetoresistive head wherein the sensor is responsive to read track widths of less than 20 microinches.

Chart II set forth below is a listing of areal density, the KBPI×TPI for such areal density and the magnetic bit sizes for the applicable areal density in which the present invention has utility:

CHART II

| Bits per inch × Tracks per inch | Magnetic Bit Size-(Length) (Micrometers) | Magnetic Bit Size-(Width) (Micrometers) |
|---|---|---|
| 48 kbpi × 2100 tpi | 10.000 | 0.710 |
| 150 kbpi × 6600 tpi | 3.100 | 0.150 |
| 400 kbpi × 25 ktpi | 0.800 | 0.064 |
| 800 kbpi × 50 ktpi | 0.400 | 0.032 |
| 1,000 kbpi × 100 ktpi | 0.300 | 0.015 |

Information about data errors is itself a valuable signal and can be determined in response to signals produced by the head, transducer or sensor. The information about data errors can be used to dynamically and rapidly adjust the state of the sensor (such as its position relative to a data track), so as to improve operation of the information storage system.

The apparatus of the present invention provides for using a transducer for sensing from predetermined storage locations stored data containing at least one constraint. The at least one constraint in the data may be in many forms. For the purpose of this invention, a constraint is some aspect of data, or an encoding of the data, or signal generated from the data, such that what is received from the transducer can be compared in some way with what was expected to be received so as to ascertain the extent of the difference. Often, the differences are due to some external effect on the signal carrying the data. The constraint may be an analog constraint, such as a limitation on the frequencies that can appear in the signal or the properties of the signal waveform. The constraints may be digital such as from an encoding process such as a parity check code or an error-correcting code ("ECC").

Generally, encodings that introduce or impose constraints on signals have the property that the bit string resulting from the encoding is a subset of all possible bit strings of the same length. An appearance of a disallowed bit string, i.e. one that would not be produced by the encoding, in the process of receiving the signal containing the data, shows that the recovered data violates the constraint.

Accordingly, by determining the manner in which the constraint is violated, for example with an ECC, then any errors and extent of errors introduced into the signal can be ascertained, and this information used in accordance with the teachings of this invention.

An example is a Reed-Solomon type ECC encoding of a bit sequence. The ECC encoding will include both the data and the "syndrome" computed from the data (the bit sequence). This has the property that only a subset of the bit sequences, whose length is the length of the data plus the syndrome, is possible. If a signal containing the ECC encoded data is received, the decoding will reveal whether a correct sequence of data bits and syndrome bits is received or not. If not, than the extent of the errors in the signal can be determined, up to some number of errors that depends on the details of the ECC method.

Thus, by using the knowledge about the at least one constraint imposed on the first signal, a control signal containing information about the extent of errors can be immediately generated and used to perform a control function in accordance with the teachings of this invention.

Sensors that respond to digital data that is recorded for storage in an information storage system can generate signals that are responsive both to actual data and to errors in reading that data. The system can dynamically determine in response to signals produced by the head, transducer or sensor, both the actual data and information about those errors.

Analog techniques used for encoding individual bits and sequences of bits can be used to determine both the probable actual data and one or more measures of deviation from error-free retrieval of that actual data, e.g. PRML encoding techniques for storing and retrieving data.

PRML encoding techniques are used to encode data as it is stored on a disc drive as is well known in the art. During reading of a segment of data stored in PRML form using the state-of-the-art apparatus and method, the signal being read by the head, transducer or sensor, e.g., an MR head, is sampled at periodic intervals. The sample points are picked to be synchronous with the signal and sampling occurs at points where the signal is expected to take on specific values.

The present invention resides in apparatus and methods for using information about the extent of errors in sensed data for performing as a control function of at least one of adjusting the position of a transducer, such as a magnetic head, to improve alignment relative to a track and deriving from two or more data signals a data signal having the least amount of errors. The apparatus and method use the information about the extent of errors to perform a control function for reproducing the data stored in predetermined storage locations in a storage media.

The present invention is based on the sensing of recorded information or data on a storage media. The sensed or reproduced data contains errors introduced into the first signal during sensing of the information or data as a result of the transducer or sensor being offset from the predetermined storage locations, such as a track.

If the information or data as recorded or stored contains an error, the sensed data likewise includes such errors in the data. Such errors in the record data are different than any errors introduced into the sensed data as the same is being sensed which is the disclosure and teachings of this invention.

Description of the Figures

Referring now to FIGS. 1 through 10, which describe several embodiments of the present invention, the apparatus, methods, detection systems and detection apparatus for reproducing data using information about the extent of errors are described hereinbelow.

In the pictorial representation of FIG. 1, apparatus for using information about the extent of errors is shown generally by arrow 20. A treated surface 22 of a storage media stores data containing at least one constraint in the predetermined storage locations 24. The data containing at least one constraint is stored on the surface in the predetermined storage locations 24 during a write operation.

The data containing at least one constraint may take the form of a number of data encoding techniques which have a known relationship with the data associated with the constraint. Use of error coding techniques enable the true data to be determined with greater likelihood than erroneous data, notwithstanding errors, such as clutter or noise, which can interfere with correct reading of data in an information storage system.

A transducer 26 is positioned for sensing the predetermined storage locations 24 and generates a first signal representative of the data containing at least one constraint stored in the predetermined storage locations 24 and any errors introduced into the sensed data during the sensing. The first signal is shown by lead 30.

A input device, sometimes referred to herein as a detector, 34 is responsive to the first signal 30 for applying the sensed data signal shown by lead 38 to a control signal generating device, shown generally by box 42, for generating a control signal containing information about the extent of errors. The control signal is used for performing a control function as described hereinbelow. The input device 34 extracts a data signal shown as 56 as the reproduced data.

The control signal generating device 42 generates a control signal containing information about the extent of errors which may be used to perform the control function of controlling an adjusting element 48. The adjusting element 48 is operatively coupled to the transducer 26 by an actuatable assembly as represented by dashed line 52. The adjusting element 48 through the actuatable assembly shown by dashed line 52 adjusts or repositions the transducer 26 in a direction to position the transducer 26 in a direction to improve alignment relative to the predetermined storage locations 24.

Figure 2A:
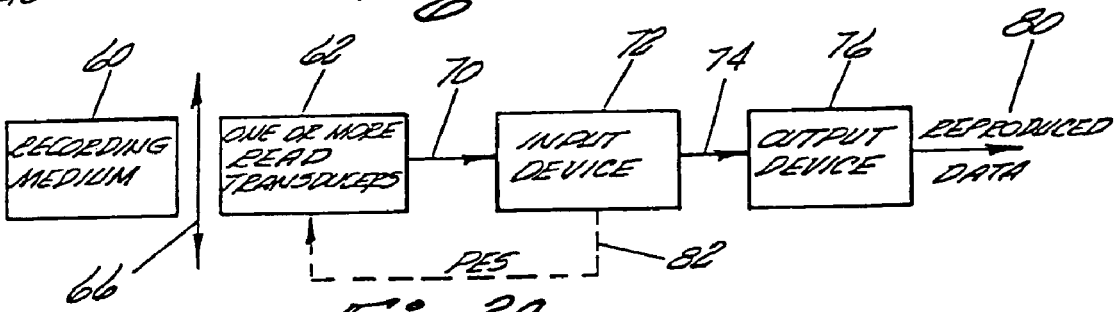
FIG. 2A is a block diagram of a recording medium interacting with a one or more transducers including a read transducer, an input device and an output device to generate control signals and to extract data signals for improving the extracted data utilizing the teachings of the present invention.
Figure 2B:
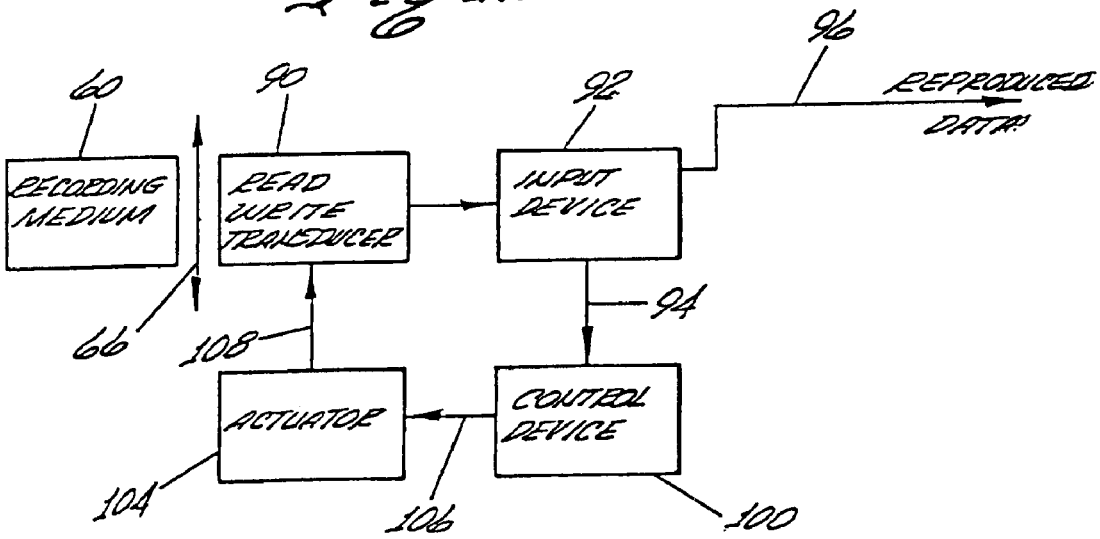
FIG. 2B is a block diagram of a recording medium interacting with a read transducer, a detector, an adjusting element and a control device for adjusting position of a transducer with an actuator in response to a dynamic servo signal used as a position error signals utilizing the teachings of the present invention utilizing the teachings of the present invention.

In a preferred embodiment, the adjustment element 48 includes an actuator, such as for example that actuator 104 in FIG. 2B The actuator is responsive to the control signal applied thereto by the control signal generating means to move or physically realign the transducer 26. The transducer 26 is a disc head in the preferred embodiment and is positioned to improve alignment relative to the predetermined storage locations 24, or data track in the preferred embodiment. This movement or realignment is in a direction to eliminate any mispositioning or misalignment which the transducer 26 may have with regard to the predetermined storage locations 24, or track. Thus, if the transducer 26 is determined to be mispositioned or misaligned from the predetermined storage locations 24, the transducer 26 is physically moved right or left to position the transducer 26 in a position to improve alignment relative to he predetermined storage locations 24.

The transducer 26 of FIG. 1 may a first transducer which is positioned relative to a second transducer as illustrated by box 62 in FIG. 2A. The first transducer and the second transducer sense the predetermined storage locations and generate a first signal and a second signal representative of data containing at least one constraint from the predetermined storage locations and any errors introduced into the sensed data during the sensing. An input device generates the control signal from one of the first signal and the second signal and extracts a first data signal and a second data signal. An output device is responsive to the control signal and at least one of the first data signal and the second data signal to derive therefrom a data signal containing the least amount of errors.

In addition the transducer 26 may be a first transducer including at least two sensors for concurrently sensing the predetermined storage locations and generating a first signal and a second signal each representative of the data containing the at least one constraint from the predetermined storage locations and any errors introduced into the sensed data during the sensing. In such event, the input device extracts a first data signal and a second data signal as the reproduced data. In addition, the input device 34 applies the first signal and second signal to the control signal generating device 42 to generate a control signal. In this embodiment, the control function is responsive to the control signal and at least one of the first data signal and the second data signal to perform at least one of generating a dynamic servo signal and deriving from the first data signal and the second data signal a data signal containing the least amount of errors.

The block diagram of FIG. 2A illustrates one embodiment of apparatus for using information about the extent of errors. The data containing the at least one constraint is stored on storage media, such as a recording medium 60 which interacts with a read transducer 62 due to relative movement therebetween illustrated by arrow 66. The recording medium 60 stores data containing the at least one constraint in predetermined locations illustrated by predetermined locations 24 in FIG. 1. The read transducer 62 is positioned for sensing said predetermined storage locations on the recording medium 60 and generates a first signal 70 that is representative of the data containing said at least one constraint and any errors introduced into the sensed data during the sensing. The first signal 70 is applied to an input device, or detector, 72 which is responsive to the first signal 70 for generating a control signal containing information about the extent of errors in the sensed data and for extracting data signals. The control signal is applied to an output device 76. The control signal is used to perform the following control function in this embodiment.

The output device 76 reproduces the extracted data signal from the sensed data as shown on lead 80. Concurrently, the control signal and extracted data signal are applied to output device 76 as shown by lead 74. In addition, the control signal as shown by lead 82 is used to produce a dynamic servo signal which are used to improve alignment of the transducer 62 relative to the predetermined storage locations on the recording media 60. In this embodiment, the dynamic servo signal are in the form of substantially continuous servo signals, or position error signals applied to a servo control, all of which are represented by dashed line 82, to improve alignment of the transducer 26 relative to predetermined storage locations on the recording media 60.

The block diagram of FIG. 2B is a more detailed block of the apparatus of FIG. 2A and illustrates the recording medium 60 interacting with a read/write transducer 90, a detector 92 and an control device 100 which is an adjusting element, to control an actuator 104 to adjust the position of transducer 90 via elements represented by lead 108 in a similar manner as described in connection with FIG. 2A above. The detector 92 produces the reproduced data as shown by output 96. The control device 100 is responsive to the control signal from the detector 92 to generate position error signals, which is a dynamic servo signal appearing on lead 106 and the dynamic servo signal are applied to an actuator 104 via lead 106. The actuator 104 adjusts the position of the transducer 90 via elements represented by lead 108.

The apparatus illustrated in FIG. 2B may also be used as a servo control during the write sequence or operation by virtue of the transducer having a read/write transducer. If the structure of the transducer enables a read and write at the same time, then a dynamic servo signal is continuously applied to the servo system to control head/track alignment.

If the structure of the transducer does not permit a read and write to occur at the same time, then the dynamic servo signal is disabled for the period approximately equal to a write period. Circuits for performing these functions are well known to persons skilled in the art.

Figure 2C:
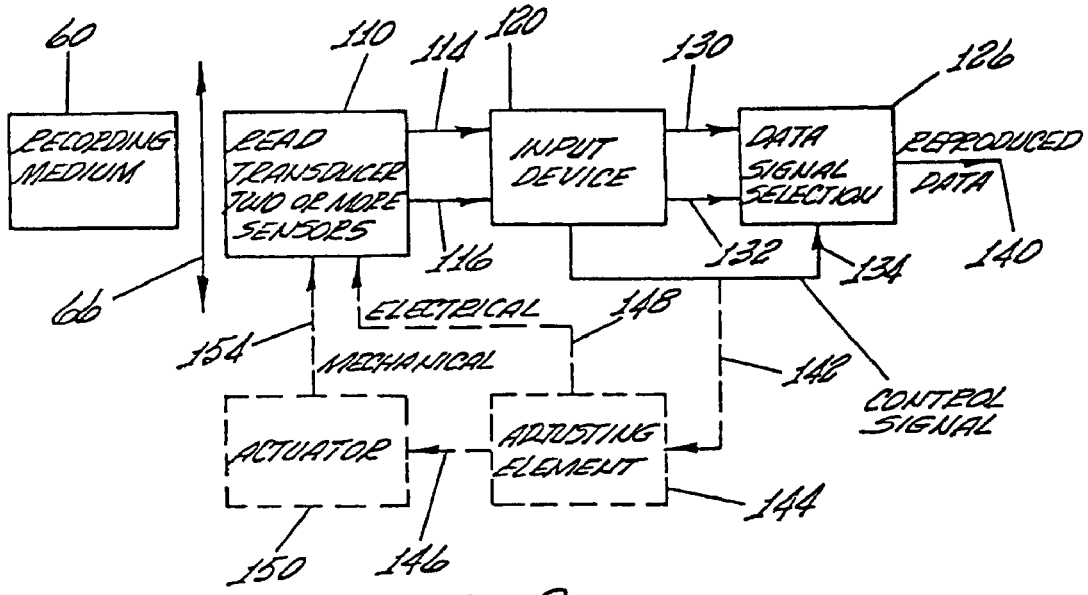
FIG. 2C is a block diagram of a recording medium interacting with a read transducer having two or more sensors, an input device, an data signal derivation, e.g. selection, device for improving extracted data signals, an adjusting element and actuator for adjusting position of a transducer to improve alignment with a predetermined storage location or electrically shifting the operating characteristics of the transducer in response to a dynamic servo signal utilizing the teachings of the present invention.

The block diagram of FIG. 2C is yet another embodiment of apparatus for using information about the extent of errors. FIG. 2C illustrates the recording medium 60 interacting with a read transducer having two or more elements as shown by numeral 110. The transducer 110 generates a first signal 114 and a separate second signal 116, one from each element. The first signal 114 and the second signal 116 are applied to a input device 130 which generates a control signal as described hereinbefore and also extracts a first data signal and a second data signal. The control signal is applied by lead 134 to a data signal selection device 126 together with the extracted first data signal and second data signal as represented by leads 130 and 132. In this case, the derivation is a simple selection mechanism known as a multiplexor. The data signal selection device 126 is responsive to the control signal 134 and the first data signal 130 representing the first signal on lead 114 and a second data signal 132 representing the second signal on lead 116 to derive therefrom a data signal containing the least amount of errors.

Concurrently, the input device applies the control signal to an adjusting element 144 via lead 142. In this embodiment, the adjusting element generates a dynamic servo signal which are applied to an actuator 150 via lead 146 to mechanically adjust the position of the transducer 110 to improve alignment between the transducer 110 relative to the predetermined storage locations. In the alternative the adjusting element 144 can generate an adjusting signal which can be used to electrically shift one of or both of one of or of two or more sensors the operating characteristics of one of the two or more sensors to reduce the extent of errors introduced into the sensed data. An example of such a transducer and structure thereof is discussed hereinbelow in connection with FIG. 3E.

The apparatus illustrated in FIG. 2C enables an output device to be responsive to the control signal to produce a dynamic servo signal to improve alignment of the transducer relative to the predetermined storage locations concurrently with the derivation of a data signal containing the least amount of errors from the first data signal and second data signal developed from the two or more read sensors.

Figures 3A, 3B, 3C:
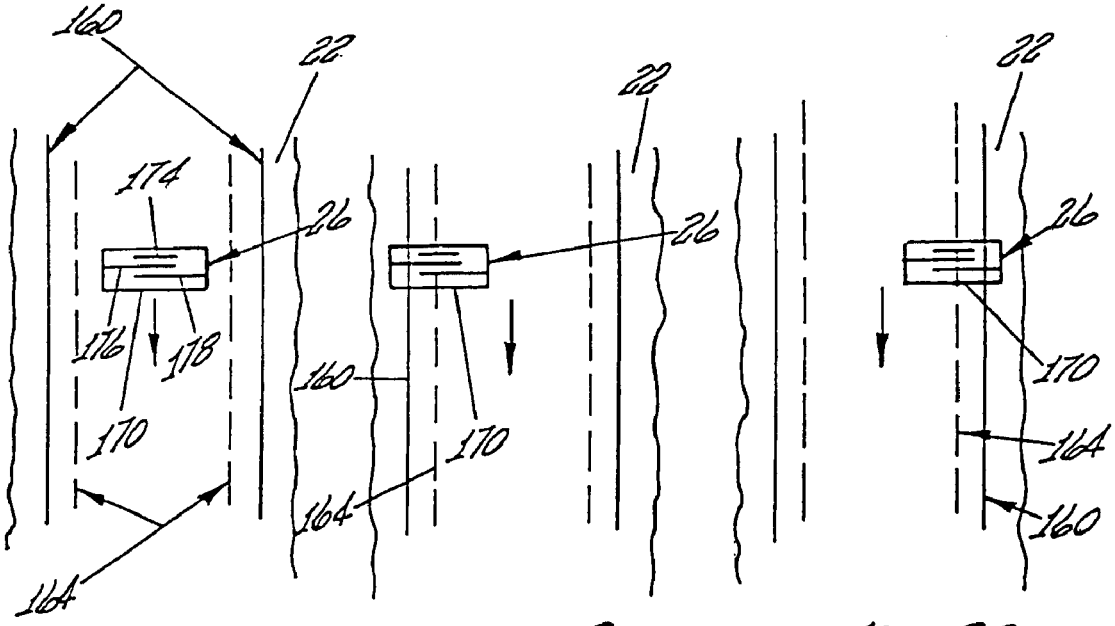
FIG. 3A is a pictorial representation of a surface of a storage media depicting the width assigned to a track on the surface, the width of a track containing stored data and the width of a transducer having a write transducer and two read magnetoresistive elements for sensing the stored data within the predetermined storage locations defined by the track with the transducer positioned in alignment with the track containing the stored data.
FIG. 3B is a pictorial representation of a surface of a storage media depicting the width assigned to a track on the surface, the width of a track containing stored data and the width of a transducer having a write transducer and two read magnetoresistive elements for sensing the stored data within the predetermined storage locations defined by the track with the transducer misaligned to the left side of a track.
FIG. 3C is a pictorial representation of a surface of a storage media depicting the width assigned to a track on the surface, the width of a track containing stored data and the width of a transducer having a write transducer and two read magnetoresistive elements for sensing the stored data within the predetermined storage locations defined by the track with the transducer misaligned to the right side of a track.

FIG. 3A, FIG. 3B and FIG. 3C are pictorial representations of a treated surface 22 of a storage media depicting the width 160 assigned to a predetermined storage location or track on the surface 22. The actual width of the predetermined storage track storing data containing at least one constraint is shown by dashed lines 164. The length of a transducer 26 is depicted by length of side 170. The length 170 of the transducer 26 is less that the width of the actual predetermined storage locations 164 and of the area assigned for the track 160.

Referring now to FIG. 3A, the transducer 26 is illustrated as being positioned in substantial spatial alignment with the predetermined storage locations or track 164 storing the stored data containing the at least one constraint. In this position, the transducer 26 reads the stored data with minimum errors.

In FIG. 3B, the transducer 26 is misaligned to one side, the left side as shown in FIG. 3B, of predetermined storage locations or data track 160. In this position, the transducer 26 is misaligned and has a portion of the sensing element off track relative to the predetermined storage locations or track 164 and is off track and beyond the surface area assigned for the track as shown by line 160.

In FIG. 3C, the transducer 26 is misaligned to the other side the right side as shown in FIG. 3C, of predetermined storage locations or track 164. In this position, the transducer 26 is also misaligned and has a portion of the sensing element off track relative to the predetermined storage locations or track 164 and is off track and beyond the surface area assigned for the track as shown by line 160.

Figures 3D, 3E:
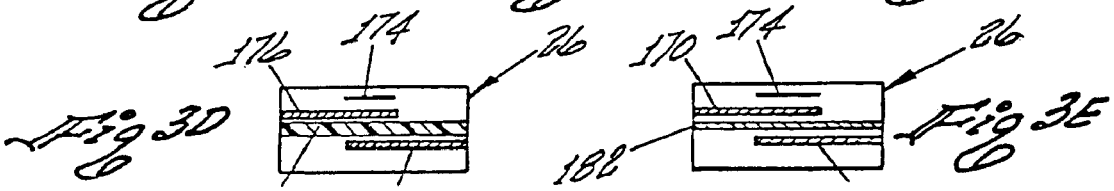
FIG. 3D is a pictorial representation of a transducer having a write transducer and two magnetoresistive elements as the read transducers which have an insulative shield therebetween.
FIG. 3E is a pictorial representation of a transducer having a write transducer and two magnetoresistive elements as the read transducer which have a conductive shield therebetween which is responsive to a bias voltage to shift the magnetic operating characteristics of the magnetoresistive sensors.

FIGS. 3D and 3E are pictorial representations of two embodiments of transducers having a write transducer and two magnetoresistive sensors as the read transducers which may be used in the apparatus, system and method of the present invention.

In the pictorial representation of FIG. 3D, the transducer 26 has a write transducer 174 and two read transducers which, in this embodiment, are two magnetoresistive elements 176 and 178 which have an insulative shield therebetween. The magnetoresistive elements 176 and 178 are at least two sensors supported in a fixed, spaced relationship to each other.

In the pictorial representation of FIG. 3E, the transducer 26 is likewise a write transducer 174 and two read transducers which, in this embodiment, are two magnetoresistive elements 176 and 178 which have an conductive shield therebetween which are responsive to an adjusting voltage to shift the magnetic operating characteristics of the magnetoresistive elements. By electrically shifting the magnetic operating characteristics of the transducer in addition to or in lieu of physically shifting or adjusting the position of the transducer with a servo system in response to position error signals, the extent of errors in at least one of said first signal and said second signal is reduced. In this transducer structure, the magnetoresistive sensors 176 and 178 are at least two sensors supported in a fixed, spaced relationship to each other.

When the transducer 26 of FIGS. 3A and 3B is used in the apparatus, system or method of the present invention, the transducer includes at least two sensors for concurrently sensing the predetermined storage locations and generating a first signal and a second signal each representative of the data containing the at least one constraint from said predetermined storage locations and any errors introduced into the sensed data during the sensing. In certain of the embodiments of the apparatus, system and method, an output device is responsive to at least one of the first signal and the second signal to produce a control signal that is applied to and/or used to derive a data signal containing the least amount of errors from the first data signal and second data signal extracted from the signals from the two sensors.

As discussed above in the Background, the future disc drive systems are to have track widths that are smaller in width. The read track widths are less than 50 microinches and smaller, and the magnetic bit sizes on the stored surface 22 for magnetically recording the data are also becoming smaller. As a result, precise head/track alignment is very important in reducing errors in the sensed data read from a predetermined storage locations or track containing the stored data containing at least one constraint and the apparatus described in FIGS. 1, 2A, 2B and 2C above have utility for such applications.

In a preferred embodiment, the surface 22 is a magnetic recording surface of a magnetic disc and the track 160 includes a material responsive to electromagnetic fields so as to read or write the data bits thereon, and such magnetic discs and techniques for reading and writing magnetic data are well known in the art.

Although embodiments of the invention are described with regard to storage and retrieval of digital data using magnetic discs, the invention has wide applicability to other forms of data storage, such as for example optical discs, laser disc, digital video discs, holographic memories and the like. In general, the invention includes all those embodiments in which reading or writing data is responsive to a state of the art sensor with regard to an information storing medium.

Figure 4:
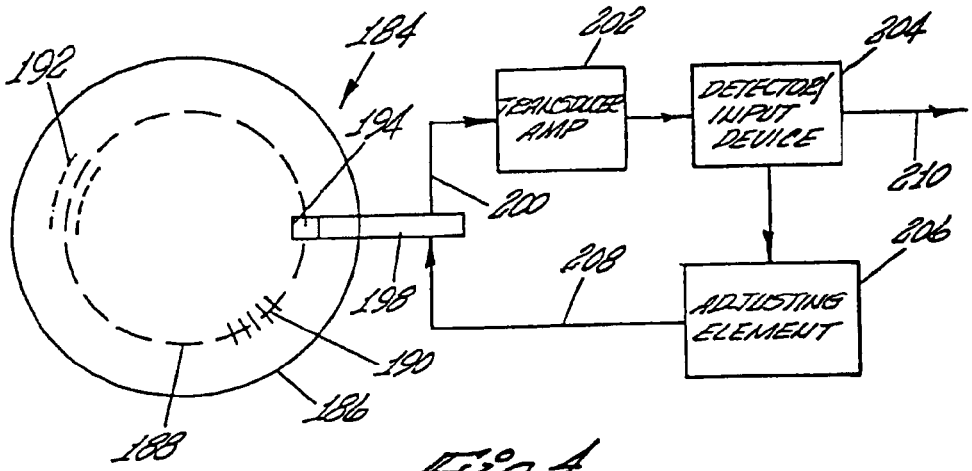
FIG. 4 is a schematic diagram of an embodiment of an apparatus having a rotating recording surface having predetermined storage locations containing data and having a slider/loading arm for loading and adjusting a transducer relative to predetermined storage locations and other elements for improving extracted data signals using the teachings of the present invention.

In FIG. 4, the schematic diagram illustrates one embodiment of an apparatus for a rotating disc memory. The apparatus shown generally as 184 has a rotating recording surface 186 having a circular track shown by line 188 and having predetermined storage locations 190 storing data containing at least one constraint. A head 194 is mounted on the end of a head/loading arm 198 for loading and adjusting the head 194 relative to and in a direction to improve alignment with a track 188 relative to the predetermined storage locations 190.

In FIG. 4, the sensed data from the head 194 is applied via lead 200 to a transducer amplifier 202. The output from the transducer amplifier 202 is the first signal. The first signal is the sensed data containing the at least one constraint and any errors introduced into the sensed data during the sensing. The first signal is applied to a detector 204. The detector 204 generates a control signal containing information about the extent of errors which is used as a position error signal and applies the control signal to an adjusting element 206. The adjusting element 206 than generates the position error signals which are used to actuate the head/loading arm 198 as illustrated by lead 208 to reposition the head 194 as required in response to the position error signals. The detector 204 produces an output signal represented by lead 210, which is the extracted data signal used as the reproduced data.

In FIG. 4, the track 188 may include therein servo burst signals illustrated by lines 192 The apparatus of FIG. 4 can be used for using information about the extent of errors in combination with servo burst signals generated from prerecorded servo bursts. A new and novel method of using the prerecorded servo burst in combination with the teachings of this invention will be described hereinbelow.

Figure 5:
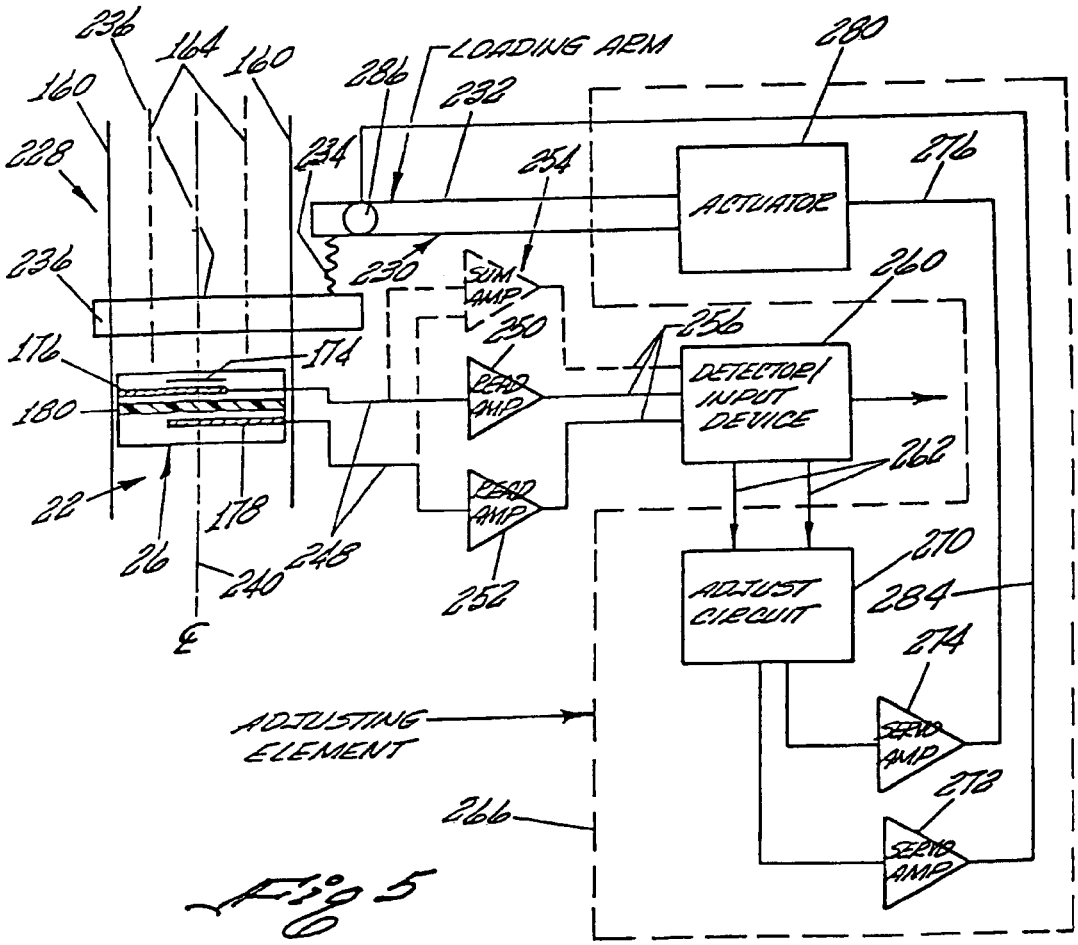
FIG. 5 is a schematic diagram of yet another embodiment of an apparatus having a rotating magnetic media recording surface having predetermined storage locations containing data and having a slider/loading arm for loading and adjusting a magnetoresistive transducer having two magnetoresistive elements relative to predetermined storage locations and other elements including a plurality of amplifiers for receiving the signals generated by each magnetoresistive transducer for improving the extracted data using information about the extent of errors.

The schematic diagram of FIG. 5 illustrates yet another embodiment of an apparatus shown generally as 228 having a rotating magnetic media recording surface 22 having a data track 164 having recorded data containing at least one constraint stored thereon in predetermined storage locations or data track 164. A head/arm assembly shown generally as 230 includes an arm 232, a flexure 234 and a slider 236 having a transducer 26 having two MR elements 176 and 178 forming a part of the slider 236, which is known as a head/slider assembly. The head/loading arm 230 is used for loading and adjusting the transducer 26 relative to the center line 240 of track 160 and predetermined storage locations such as data tack 164. The transducer 26 has two MR elements or read sensors 176 and 178 and the MR elements 176 and 178 are staggered relative to each other and to the predetermined storage locations or data track 164. An insulating layer or shield 180 separates and shields the MR elements 176 and 178 to reduce cross-talk and signal interference between the MR elements 176 and 178. Each of the MR elements 176 and 178 produce an output signal appearing on leads 248 comprising the sensed data containing at least one constraint and any errors introduced into the sensed data during sensing. Each signal from each MR element 176 and 178 is applied to read amplifiers 250 and 252, respectively. Also, for certain transducers where the sum of the output signal is desired or required as part of generating a control signal, each output from each of the MR elements 176 and 178 may be applied to a summing amplifier such as amplifier 254.

The transducer 26 in this embodiment is in the form of two shielded MR elements. One example of such a transducer is an MR element which is referred to as the Dual-Stripe MR Head offered for sale by Headway Technologies, Inc., of Milpitas, Calif.

In the alternative, the transducer 26 may be formed of two MR elements having a conductive shield as illustrated in FIG. 3E.

If such a transducer was used in the apparatus illustrated in FIG. 5, the operating characteristics of the MR element could be shifted electrically by use of a bias signal and such electrical shift would be either in lieu of or performed concurrently with the adjusting of the transducer by a servo system in response to position error signals.

The MR element may be a single transducer 174. It is also envisioned that in alternative embodiments, the transducer may include three (or more) read sensors and/or two or more write transducers. Such a structure would permit monitoring of and/or deriving of sensed data containing the at least one constraint from all elements.

The detector in this embodiment is capable of responding to the control signal containing the at least one constraint and to the extracted first data signal and second data signal developed from the at least two transducers to derive a data signal having [the least number of] *fewer* errors. In this manner the reproduced data is the extracted data signal having the least amount of errors. In addition, the control signal containing information about the extent of errors can be used to develop position error signals for a servo system as described herein.

There is no requirement that the transducer 26, which in this embodiment is a disc head, include any particular number of read sensors, such as additional MR elements similar to MR elements 176 and 178.

This invention is also effective using only a single MR head, such as for example MR element 176, as discussed in connection with FIG. 7.

The output signal of each MR element 176 and 178 provides the sensed data containing the at least one constraint and any errors introduced into the sensed data during sensing. These signals are applied via their respective read amplifiers 250 and 252 and the outputs of the read amplifiers 250 and 252 are the first signal and second signal. In the preferred embodiment, the first signal and the second signal appear on output shown by element 248 in the form of a time-varying electromagnetic signal, e.g. a voltage signal, responsive to positions of the corresponding MR elements 176 and 178 relative to the predetermined storage locations or data track 164.

Each read amplifier 250 and 252 receives the first signal and second signal representative of the sensed data containing at least one constraint from its associated MR element 176 and 178. The read amplifiers 250 and 252 each amplify the signal and perform any other required signal processing. Such signal processing may be for example conditioning the signal, converting the signal to another format, e.g. a quantized digital format or a remodulated format such as PCM.

The outputs 256 from the read amplifiers 250 and 252 (including the output from the summing amplifier 254 if required) are applied to a detector 260 which in turn, generates a control signal containing information about the extent of errors. In this embodiment, the detector 260 applies the control signal containing information about the extent of errors to an adjusting circuit 270 which generates position error signals developed from the control signal.

In the embodiment of FIG. 5, the detector 260 is responsive to the first signal and second signal and, if required, the sum signal, all of which are represented by leads 256. The detector 260 processes the first signal and second signal to determine the at least one constraint in the data signal by computing the errors or developing the errors by comparing the observed signal with the expected signal. As an example, the detector 260 can perform one or more of the following processing techniques for extracting the data signal and generating a control signal containing information about the extent of errors:

(1) Add the components of the amplified first signal and amplified second signal to determine a unified first signal, from which the detector can extract the data signal and generate a control signal containing information about the extent of errors;

(2) Subtract the components of the amplified first signal and amplified second signal to determine a differential therebetween which is used as the first signal from which the detector can extract the data and generate a control signal containing information about the extent of errors;

(3) Use one or more of the components of the amplified first signal and amplified second signal to determine a unified or integrated first signal, such as for example, by weighing the first signal at one value and the second signal at a second value, e.g. 25% and 75%, respectively, and select, which is included in the meaning of derive, those components of each of the first signal and second signal for further processing to extract a data signal and to generate a control signal containing information about the extent of errors;

(4) Process the components of the amplified first signal and amplified second signal separately to derive the extracted data signal containing the least amount of errors and generate a control signal containing information about the extent of errors; and (5) Process the components of the amplified first signal and amplified second signals to separately extract a first data signal and a second data signal and to generate a control signal which is used to derive a data signal having [the least number of] *fewer* errors so as to produce separate signals, e.g. position error signals, for horizontal displacement, angular orientation, or vertical displacement of a transducer relative to the predetermined storage locations, such as a track.

In this embodiment, the error detector 260 generates a unified control signal which is applied to the adjustment element 230 to determine separate signals for horizontal displacement, angular orientation and vertical displacement of the transducer relative to the predetermined storage locations, such as a track.

In FIG. 5, the control signal appears on outputs 262 and is applied to an adjustment circuit 270 which is responsive to the control signal to produce two position error signals which are applied to servo amplifiers 272 and 274. Servo amplifier 274 produces a component of the control signal containing information about the extent of errors on lead 276 which is applied to a coarse actuator 280 via lead 276 for moving or actuating the head/arm assembly to position the same in a direction to improve alignment with the predetermined storage locations, such as data track 164.

The other position error signal from the servo amplifier 172 is applied via lead 284 to a fine micropositioner 286 which may be an articulated end of an arm 232 for micromoving or microactuating of the head/arm assembly to position the same to improve head alignment with or to achieve substantial alignment relative to the predetermined storage locations or data track 164.

Figure 6:
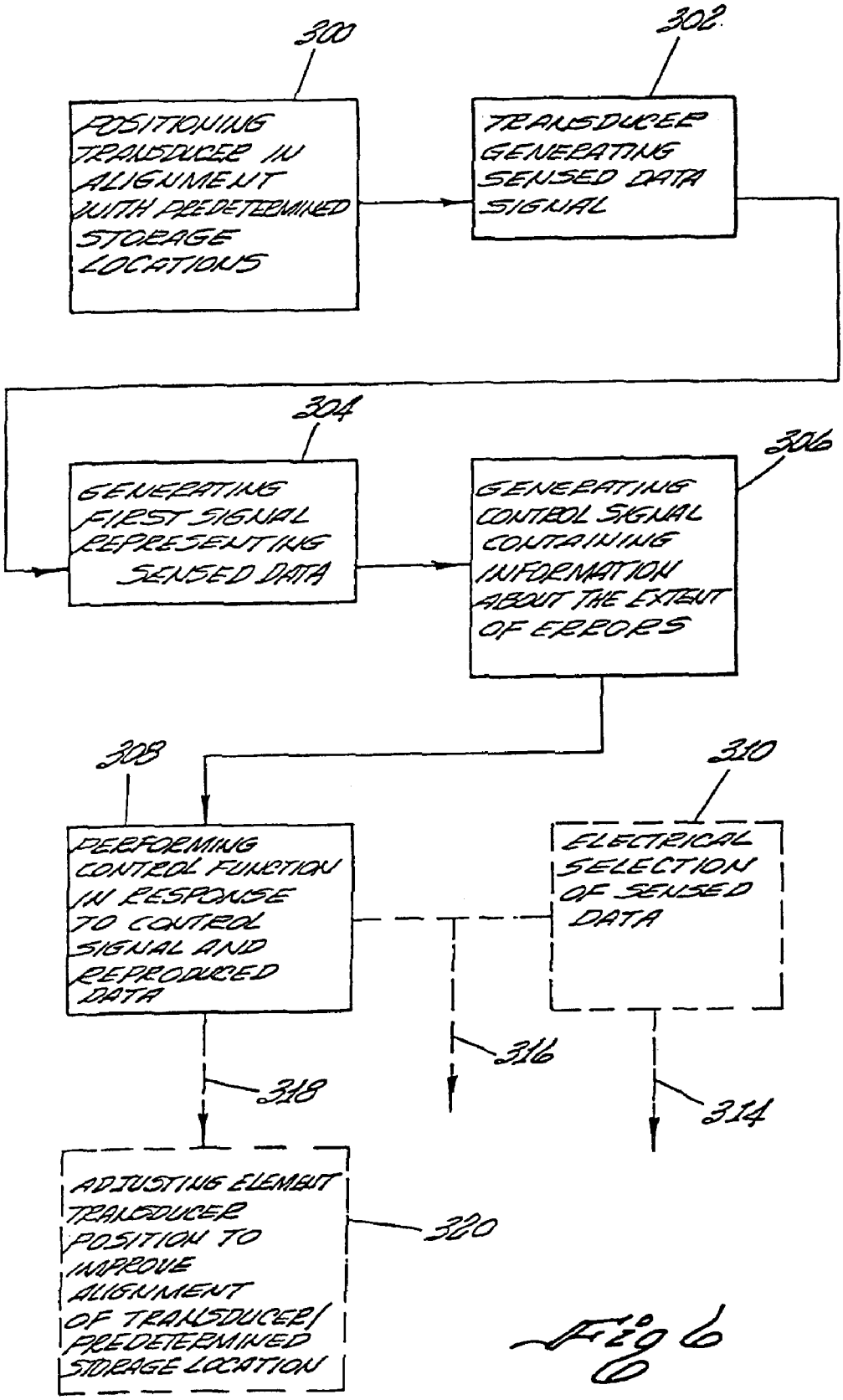
FIG. 6 is a block diagram of the various steps of a method of the present invention for using information about the extent of errors including the various steps of the method.

The block diagram of FIG. 6 illustrates the method of the present invention for using information about the extent of errors. In FIG. 6, the method comprises step 300 positioning a transducer in alignment with predetermined storage locations on a storage medium. Step 302 provides for generating from the transducer the sensed data containing at least one constraint. Step 304 provides for generating from the transducer a first signal representing the sensed data containing the at least one constraint and any errors introduced into the sensed data during sensing. Step 306 provides for generating in response to the first signal a control signal containing information about the extent of errors. Step 308 provides for performing in response to the control signal and sensed data containing at least one constraint a control function. The control function may be Step 310 providing for electrically deriving, such as for example selecting, in response to the control signal containing information about the extent of errors and from a plurality of data signals, if a first signal and second signal is produced, if more than one transducer is used or a transducer having at least two sensors is used to sense the stored data, or combination of sensed data signals that contain [the least number of] *fewer* errors and the reproduced data in the form of an extracted data signal from Step 310 is shown by arrow 314. The reproduced data may be directly used as the output as depicted by line 316.

Another control function is shown by Step 318 comprising using the control signal containing information about the extent of errors to generate a dynamic servo signal as illustrated by lead 318 and applying the same to the adjustment element to position the transducer using position error signal derived from the control signal to improve alignment of the transducer relative to the predetermined storage locations.

In the preferred embodiment of the present invention the method includes adjusting a magnetic transducer having at least two reading transducers or read elements with a servo system operatively coupled thereto for receiving as the dynamic servo signal derived from the control signal containing information about the extent of errors. The magnetic transducer is adjusted in a direction to position the magnetic transducer in improved alignment relative to the predetermined storage locations.

In the preferred embodiment, the at least two read transducers generate a first signal and a second signal and the Step 310 for deriving the sensed data signal having [the least number of] *fewer* errors performs the deriving step using sensed data.

It is envisioned that variations of this method may be used for adjusting the position of a transducer having a plurality of transducers relative to predetermined storage locations containing data being sensed by the transducer.

In the method illustrated in FIG. 6, the stored data in the predetermined storage locations contains at least one constraint. It is also envisioned that the at least one constraint is PRML encoding.

In current state-of-the-art practice, a signal received from a transducer, such as for example in a rotating magnetic memory system, is processed using a technique known as Partial Response Maximum Likelihood ("PRML"). There are several known PRML encoding methods. The methods known as PR4 and EPR4 are commonly used. The example set forth hereinbelow is for use of the PR4 method. Use of other PRML encoding methods are similar.

In PR4 processing, the signal is sampled by an analog-to-digital converter ("ADC") at periodic intervals. The sampling is done synchronously with the signal. Since a PR4 encoding method is being used, only 3 values are expected which, for purposes of this example, are termed 1,0 and −1, if there were no noise decreasing the signal-to-noise ratio or other effects on the signal, such as non-linear transition shifts (hereinafter referred to collectively as the "Signal Deterioration Effects"), perturbing the signal. These values correspond to specific outputs of the ADC which correspond to voltages in the signals and these would be deemed the observed values of the signal. Due to the Signal Deterioration Effects, the observed values produced by sampling will differ from the 3 expected values described above. For example, instead of a voltage corresponding to a 1, as the expected value, a voltage that is 0.9 times this amount might be observed. The fact that only voltages corresponding to the 3 expected values 1,0 and −1, would occur only under ideal conditions represents one example of a constraint on the signal that is used to generate information about the extent to which a transducer is not aligned with a track center.

Over repeated observations, the contributions of the Signal Deterioration Effects to signal errors will contribute about the same amount of error independent of the degree of head/track misalignment. Other of these effects, such as head lift, only occur rarely and are mostly of short duration. Therefore, over repeated observations the errors due to head/track misalignment are observable.

In accordance with the teachings of the present invention, such a signal would be a control signal containing information about the extent of errors which could be used to perform a control function as described herein.

One feature associated with use of PRML encoding is that only certain sequences of values can occur within the encoded signal or the signal containing at least one constraint. For example, in the PR4 method, not all sequences of the expected 3 values of 1,0 and −1 will occur. The "maximum likelihood" part of the PRML encoding is used to choose a best estimate, based on the possible sequences of these values, of the theoretical values that the observed values can represent. The fact that only certain sequences of symbols will occur, and not others, is another at least one constraint that is used to estimate the extent of error.

As is well known in the art of PRML decoding, alternate sequences of possible decoded data sequences are saved until the sequence exhibiting the least extent of errors can be determined. This allows the choice of that sequence exhibiting the least extent of errors as that sequence with the maximum likelihood of having been the original recorded data sequence. The extent of error measure for the chosen sequence is then available to use in the invention as at least one component of the control signal of the invention.

In light of these constraints, the observed values are compared with known or expected values. As discussed above the observed values may differ from the expected values due to the Signal Deterioration Effects. For example, one such effect may be due to the transducer rising temporarily to a greater height than normal off the disc surface due to encountering an aspersion, and then settling back to normal transducer flying height sometimes referred to as "head flying height". By computing or comparing the differences between the observed values and the expected values, the differences can be used to generate a control signal containing information about the extent of errors.

As the transducer or head passes over a track, each observation can be combined with a specific number of previous observations and the oldest observation can be dropped so that the degree of error or extent of error calculated represents that specific number of most recent observations. In this way, a dynamic signal or nearly continuous signal corresponding to the degree of misalignment can be generated and such signal represents a control signal containing information about the extent of errors.

In this method, the control signal is being derived from current data, that is defined to be data that is satisfying a read request to a disc drive or data in the same track preceding a write sequence to a disc or to a track on the disc.

The step 306 of generating a control signal also performs the step of extracting the PRML encoding from the first signal and compares the observed PRML encoding of the extracted PRML encoding with an expected PRML encoding and generates the control signal from the difference between the observed PRML encoding and the expected PRML encoding.

It is also envisioned that the teachings of this invention have utility by using the method for using information about the extent of errors in combination with servo burst signals generated from prerecorded servo bursts. The method comprises the steps of: (a) positioning a first transducer for sensing prerecorded servo bursts and predetermined storage locations having stored data containing at least one constraint and generating in response to the prerecorded servo bursts servo burst signals and in response to the stored data a first signal representative of the data containing at least one constraint from the predetermined storage locations and any errors introduced into the sensed data during the sensing; (b) producing in response to the servo burst signals a position error signal; (c) generating in response to the first signal a control signal containing information about the extent of errors in the sensed data and extracting a data signal; and (d) receiving said position error signals and said control signal and adjusting with an adjusting element in the intervals between the servo burst signals the transducer in response to the position error signals to position the transducer in a designated alignment relative to said predetermined storage locations and performing in the intervals between the servo burst signals and in response to the control signal containing information about the extent of errors a control function to improve the extracted data signal as a function of the extent of errors.

The method can also include in the step of positioning including a transducer having at least two read elements that generate the servo burst signals and a first signal and a second signal each representative of the sensed data and any errors introduced into the sensed data during said sensing. The step of receiving is responsive to the first signal and the second signal to generate the control signal and for extracting a first data signal and a second data signal. The control function between servo burst signals performs with an output device at least one of receiving the control signal for generating a dynamic servo signal to improve alignment of the transducer relative to the predetermined storage locations on said surface and being responsive to the control signal and at least one of the first data signal and the second data signal to derive therefrom a data signal containing the least amount of errors. The method in the step of positioning also includes the transducer being a magnetoresistive element.

Figure 7:
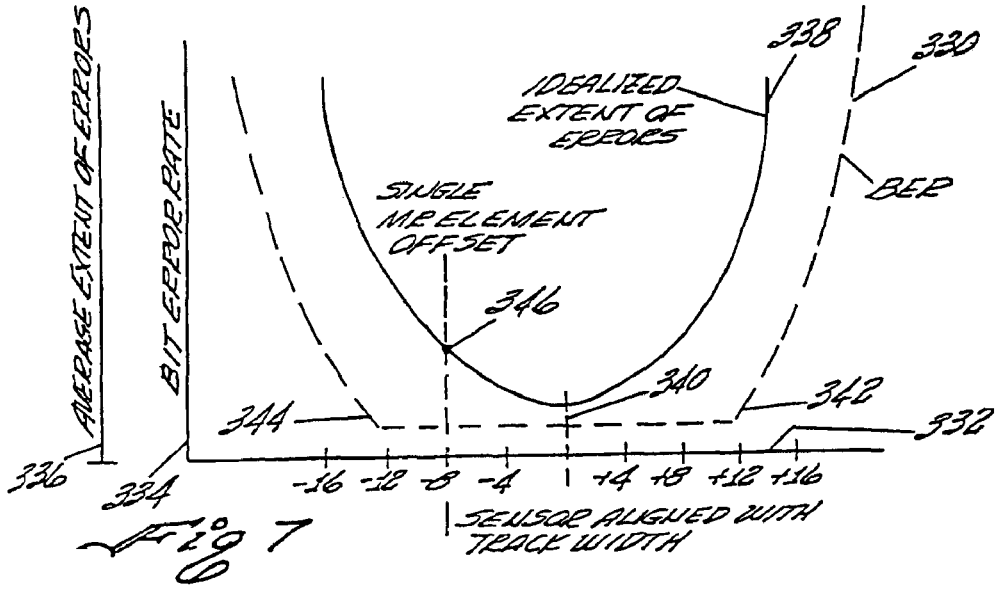
FIG. 7 shows response curves relating information about the bit error rate ("BER") plotted as a function of track width and extent of errors plotted as a function of track width.

FIG. 7 shows a dashed line curve 330 which is a plot of the bit error rate ("BER") as a function of the position of the transducer relative to the center line of a track having stored data containing at least one constraint in reading the stored data from a predetermined storage location such as a sector of a track. The BER is calculated after PRML processing. The curve 330 includes a first axis, the "X" axis, 332 showing the horizontal position of the transducer, in the preferred embodiment a disc head, relative to the width of the track, such as data track 164 shown in FIG. 5. The curve 330 has as the second axis, the "y" axis, the BER.

The response curve 330 shows that the BER curve is substantially flat about −12 microinches to about +12 microinches from the track center line of a track having a width of approximately 50 microinches. The curve 330 includes two minimum points 342 and 344 that correspond to the right and left boundaries of the track, respectively. Between the minimum points 342 and 344 and across the track width, head/track misalignment does not produce a significant number of errors.

The portion of the curve 330 extending beyond minimum points 342 and 344 rapidly slopes up as the relative horizontal displacement of the transducer increases from the center line of the trace. At these points on curve 330, a slight change of misalignment produces a significant change in the extent of errors.

The solid line curve 338 is a plot of the average extent of errors as a function of transducer position relative to the center line of the track in a manner similar to the BER curve 330. The solid line curve 338 is an idealized extent of error curve and beyond the minimum points 342 and 344 follows the BER curve 330. However, at the range of 12 microinches to about +12 microinches from the center line depicted by numeral 340, curve 318 demonstrates that a slight change in alignment produces a significant increase in the average extent of errors. This information about the extent of errors is used as the control signal and for generating a dynamic servo signal.

In the state of the art magnetic recording systems, the servo burst produces servo signals at the a rate of about 8,000 to 10,000 servo signals per second. In the present invention, the dynamic servo signal produced from a control signal containing information about the extent of errors using the teachings of the present invention result in a sampling rate significantly higher than the sampling rate of the state-of-the-art servo systems.

As a result of the above, apparatus for producing the control signal containing information about the extent of errors can be used in combination with the known Servo Burst Method. In such a combination, the control signal is used to generate substantially continuous feedback signals containing information about the extent of errors and applying the same to an actuator for positioning the read/write heads to maintain head/track alignment such that the position error signals from the apparatus are used during the intermittent open loop servo operation between or in the intervals between the servo burst signals of the Servo Burst Method. In the Servo Burst Method, the sensing of a recorded servo burst is used to produce a servo signal for adjusting the head position relative to the data track.

As discussed hereinbefore, a single MR element any be used as the read transducer in practicing this invention. In the instance where a single MR element is used as the transducer, the sensed data containing at least one constraint and information about errors can be used to determine the magnitude of adjustment required by the adjusting element. However, the direction of the adjustment is difficult to derive from the sensed data containing at least one constraint and information about errors. In the prior art Servo Burst Method, the servo burst signal can be used to develop position error signals containing information about the magnitude and direction of adjustment.

In the present invention, the control signal can contain the information required to make such an adjustment of an MR element by using the control signal containing information about the extent of errors for the apparatus having a single MR element as the reading transducer.

If the MR element is maintained slightly offset to one side of the center line, this slight misalignment produces a high average extent of errors. Referring to curve 338 of FIG. 7, an offset of about 8 microinches produces a significant rate of change in the average extent of errors as shown by line 346 on curve 338. This significant change in the average extent of errors can be used as an offset reference for the predetermined head offset.

The apparatus disclosed herein using a transducer that is a magnetoresistive sensor in a system where the predetermined storage locations is a track having a center line and the adjusting element is adjusted to position the sensor at a slight offset from the center line of the track in a known direction establishes a predetermined sensor position. In such an apparatus, the output device is responsive to the control signal containing information about the extent of errors to generate a position error signal, compensated by the predetermined sensor position, representing the magnitude and direction in which the adjusting element is to move said sensor to improve sensor/track alignment.

Thus, one servo control method for a single MR element or single sensor is to maintain the head slightly to one side of the track center between servo bursts. A small offset will provide reproduced data having substantially the same number of errors after PRML processing as compared to an ideal alignment of the head with the track. This is due to the BER in the output of a PRML processing not changing significantly as is evidenced from curve 330 in FIG. 7. As the predetermined sensor position approaches track center, the MR element or single sensor position will be corrected so as to slightly increase its displacement from track center. As the displacement is observed to increase beyond a given amount, the head position is adjusted to decrease the displacement. This method maintains the MR element alignment or single sensor between an upper and lower limit.

If the MR element or single sensor is nearer the center line of the track than a minimum displacement, then the direction of the offset becomes unknown. In such event, an adjustment is made to move the head slightly to the left. If the displacement is observed to increase, then the MR element or single sensor was to the left, otherwise the MR element was right. In this event, the adjustment may have reduced the observed offset to zero. This method can be repeated as soon as the offset is observed as shown on the curve 338 of FIG. 7.

In FIG. 7, the BER curve 330 shows that as the MR element or single sensor moves substantially off track, the signal-to-noise ratio degrades to such an extent that the rate at which the errors are observed after PRML processing increase substantially. Each side of curve 330 represents a monotonically increasing function of distance from track center. If the rate were observable, i.e. if errors occurred frequently enough, when the MR element or single sensor is close to track center, this information could be used as a control signal in accordance with the teachings of this invention. For current disc drives, in which the BER is one in $10^7$ or less most of the time, useful observations occur too infrequently to be useful.

The idealized extent of errors curve 338 shows the shape of the average extent of errors over a set of samples during PRML processing. As described herein, a new value can be obtained each time a new sample is obtained, which is in the range of 10,000 to 15,000 samples between each pair of servo bursts. This is sufficient to generate a nearly continuous servo signal, and is the preferred method in this invention.

Thus, slight changes to the MR element position which increase or decrease track offset can be used to generate information about the direction of track offset.

Figure 8:
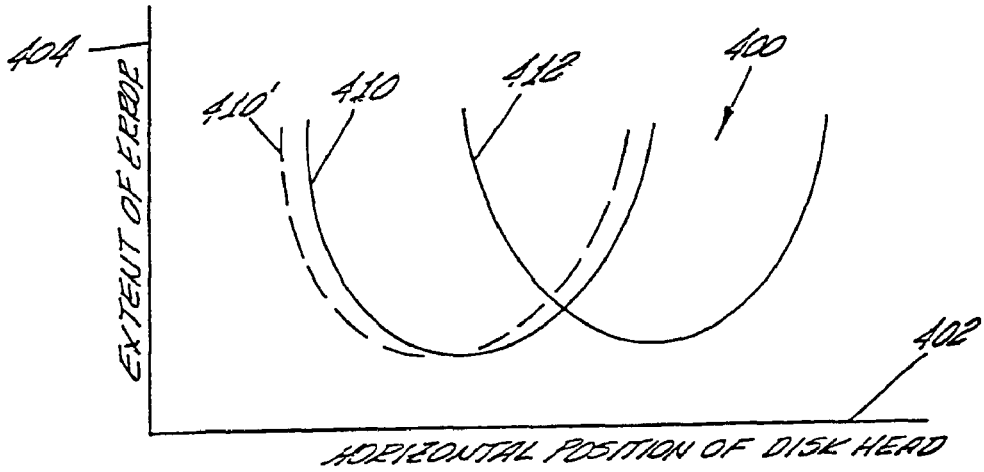
FIG. 8 shows response curves of the data signals sensed by two magnetoresistive elements positioned within a transducer as shown in FIG. 3A plotted as a function of track position and the effects of using an adjusting signal to shift the operating characteristics of one element of the two magnetoresistive elements.

FIG. 8 is a plot of extent of errors as a function of head location on a track for a transducer having two read transducers or read sensors, such as for example the transducer illustrated in FIG. 5. The plot of the curves is shown generally by numeral 400. The plot 400 includes a first axis, the "X" axis, 602 that represents the horizontal position of a read transducer and a second axis 404, the "Y" axis represents the extent of errors observed during processing.

The first curve 410 shows the relationship between BER and head position for a first read transducer and the second curve 412 shows the relationship between the BER and horizontal head position for a second read transducer.

The response curves 410 and 412 are typical of the response curves produced using the transducer 26 having two insulated MR elements 176 and 178 in FIG. 5. This information can be used to generate a position error signal for practicing this invention.

If a transducer 26 is used having two unshielded MR elements as depicted in FIG. 3E, the application of an adjusting signal on the conductive shield 182 shown in FIG. 3E will cause a shift in the magnetic characteristics of the magnetic operating characteristics of one of the MR elements. In FIG. 8, this shift is depicted by dashed curve 410'.

Figure 9:
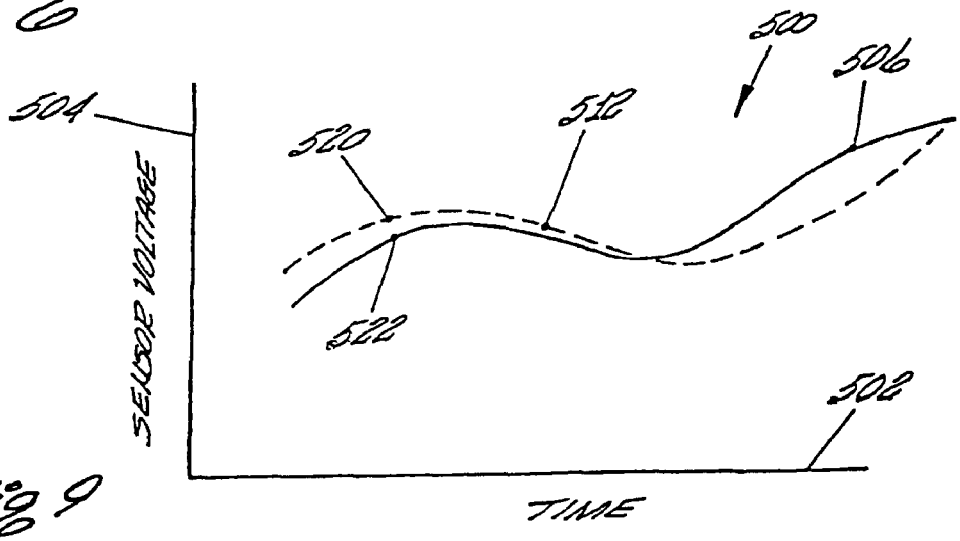
FIG. 9 shows is a waveform of an expected PRML encoded signal and waveform of an observed PRML encoded signal which is used to generate a control signal containing information about the extent of errors in the sensed data.

FIG. 9 shows an example of a PRML response waveform and a extent of error waveform represented generally by numeral 500. The plot includes a first axis 502, the "X" axis representing "time", a second axis 504, the "Y" axis, representing "sensor voltage". The response waveform is shown by a solid curve 506 and is a plot of an actual response curve. The second waveform shown by dashed line curve 512 is derived from using a set of points, of which point 520 is an example, from a plot of a known or expected ideal waveform.

The actual waveform 506 shows changes in the time-varying electromagnetic value on the second axis 504 with time on the first axis 502 as actually measured by the transducer. The actual response waveform includes a plurality of sample points 520 indicating actual sample values of the time-varying electromagnetic value determined by the PRML technique.

The ideal waveform 512 shows changes in the time-varying electromagnetic value on the second axis 504 with time on the first axis 502 as the same would be measured by the sensor for an ideal case of bit-encoding and bit-decoding. The ideal response waveform 512 includes a plurality of sample points 520 indicating ideal sample values of the time-varying electromagnetic value determined by the PRML technique.

In general, the actual response waveform 506 differs from the ideal response curve 512. The transducer receives the actual values for the actual sample points 520 and a comparator compares those values with the ideal sample values, and determines a set of sequences of data bits most likely to have produced the actual values for the actual sample points 520.

It is envisioned for one embodiment that the PRML encoding technique can be selected as a constraint for the data signal for practicing this invention in the following manner. The signal from the sensors, e.g., MR elements, can be sampled at twice the normal sampling rate or higher. After PRML decoding, using sample points as discussed hereinabove, the difference between the observed PRML encoding waveform from the sensor, e.g., MR head, and the expected PRML encoding as derived from the error corrected output data is computed. This computation provides information about the extent of errors in the sensed data signal and can be used for the control signal. Such computation is available using the computational capacity of state-of-the-art microprocessors and digital signal processors.

The following are examples of determining error rates using PRML processing: (a) The average amount by which the observed values of samples differs from the expected values of these samples, when averaged over a span of samples, which span of samples may range from a few tens of samples to a thousand or more samples; (b) the average amount of the squares of the above difference over the same range of sample sizes; (c) the average amount of squared differences between a PRML signal re-encoded from the error-corrected data output of the invention and the sensed signals, properly aligned in time, applied to each of the first data signal and second data signal that is input to the PRML decoders, to provide a measure of extent of error measurement that corresponds to the data stream produced by each PRML decoder and from which the control signal is composed; The advantage of this is that the best estimate of the expected PRML signal is that output signal that has been derived from the first data signal and the second data signal and has subsequently been PRML decoded, and possibly further error corrected as the best data output signal from the invention; and (d) other functions of these differences for these sample sizes.

When two MR elements are employed, a control signal is calculated for each in the above described manner. Then a function of all of these individual control signals combines then to produce and output control signal, there are many ways to combine the signals. The simplest is to subtract the first control signal from the second control signal and use the result as the control signal.

Figure 10:
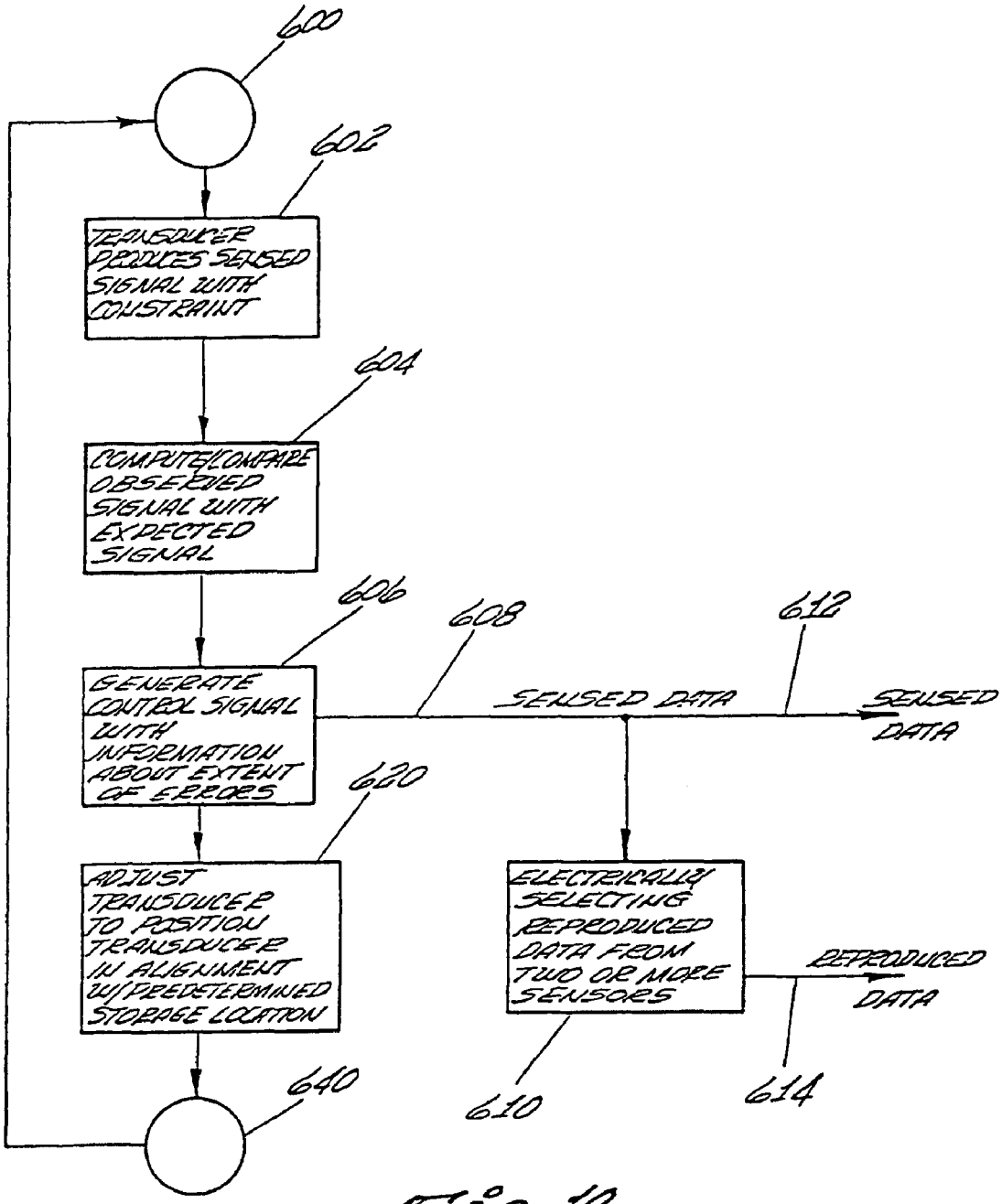
FIG. 10 shows a process flow diagram of a method for aligning a transducer to predetermined storage locations using information about the extent of errors in a control signal and producing improved data signals from sensed data containing at least one constraint.

FIG. 10 shows a process flow diagram of a method for using information about the extent of errors.

The method applies to the step of positioning using a transducer or transducers including transducers having two or more read elements to sense predetermined storage locations having stored data containing at least one constraint. The method utilizes the apparatus described herein above and is based on predetermined storage locations containing data being already written on or within a storage media.

At flow point 600, the sensor is positioned proximate to the predetermined storage locations or data track and is ready to read a sequence of data bits. At flow point 602, the transducer responds to the sequence of data bits and produces a first signal. At flow point 604, the detector or input device processes the first signal by comparing the first signal having at least one constraint with the expected signal containing the at least one constraint to generate the control signal containing information about the extent of errors. The flow point 606 also extracts the data signal from the first signal.

At flow point 606, the extracted data signal and the control signal containing information about the extent of errors may be used as shown by flow point 610 for electrically deriving a data signal having the least number of errors from multiple data signals and to produce the so derived data signal as the reproduced data 614. The extracted data can be used as the reproduced data as shown by lead 612.

At flow point 620, an adjusting element responds to the control signal containing information about the extent of errors to generate position error signals that are used to adjusting the position of the head such that the head is positioned in improved alignment relative to the predetermined storage locations or data track thereby continuing the read process as shown by flow point 640 extending back to flow point 600.

Figure 11:
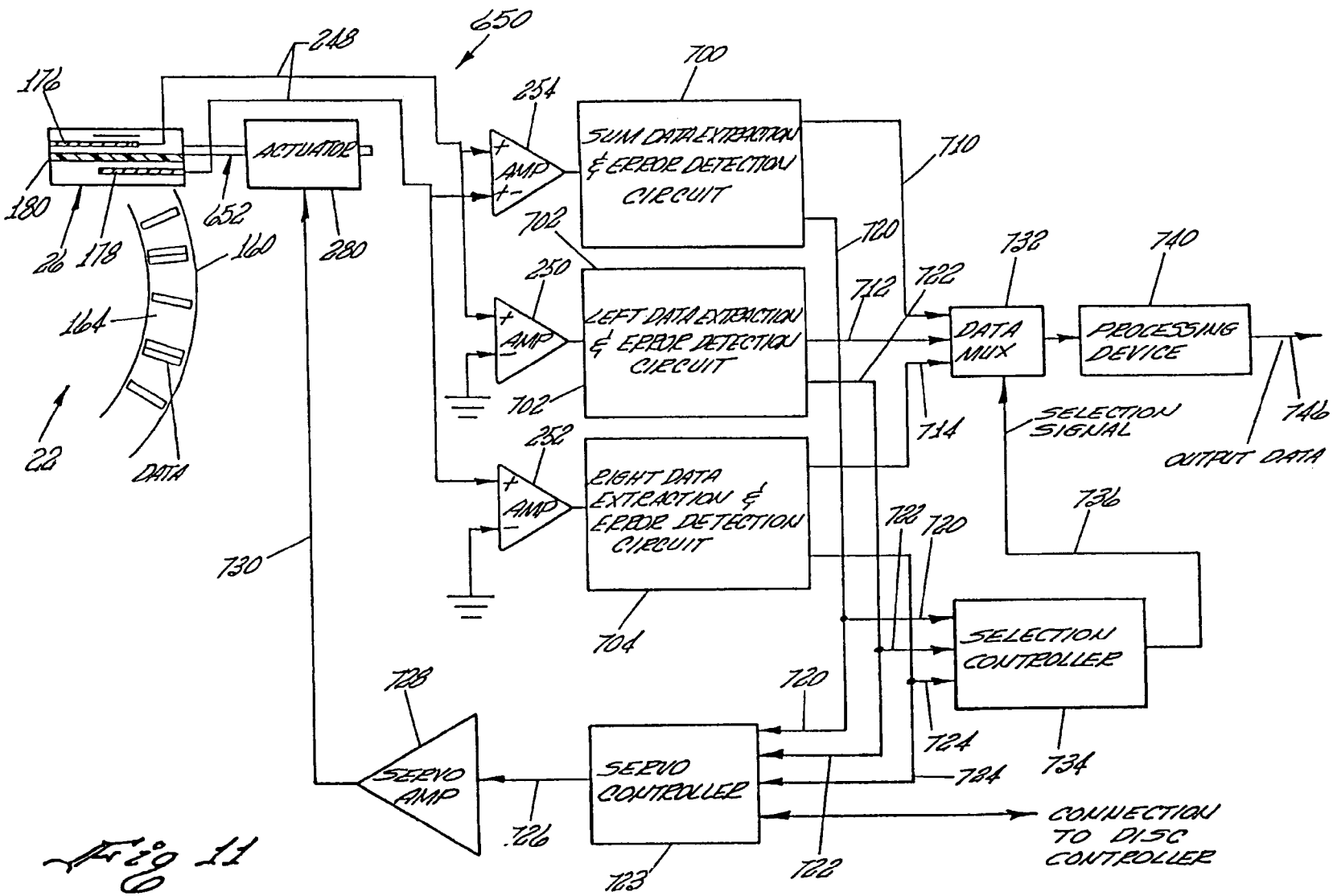
FIG. 11 is a schematic diagram of yet still another embodiment of an apparatus having a rotating magnetic media recording surface having predetermined storage locations containing data and having an actuator for adjusting a slider/loading arm having an magnetoresistive transducer having two magnetoresistive elements relative to predetermined storage locations and a plurality of amplifiers for receiving the signals generated by each magnetoresistive transducer and generating three signals used as inputs to individual data extraction and error detection circuits the controls signals and extracted data signal of which are used for improving the extracted data using information about the extent of errors.

In the schematic diagram of FIG. 11, this embodiment of the apparatus is a variation of the apparatus illustrated in FIG. 1. In FIG. 11, apparatus shown generally as 650 has a rotating magnetic media recording surface 22 having a data track 160 having recorded data 164 containing at least one constraint stored thereon in predetermined storage locations or data tracks 160. A head/arm assembly shown generally as 652 includes an arm, a flexure and a slider similar to that illustrated in FIG. 5, for supporting and adjusting a transducer 26 having two MR elements 176 and 178, having therebetween the insulating layer or shield 180, which are staggered relative to each other and to the predetermined storage locations or data track 164 in a similar manner as the transducer illustrated in FIG. 5.

Each of the MR elements 176 and 178 produce an output signal appearing on leads 248 comprising the sensed data containing the at least one constraint and any errors introduced into the sensed data during sensing. The signal from MR element 176 is applied as an input to read amplifiers 250 and 254 while the signal for MR element 178 is applied to read amplifiers 252 and 254. The output of read amplifier 254 represents the sum of the signals produced by MR elements 176 and 178. The output of read amplifiers 250 and 252 represents the signal produced by MR elements 176 and 178, respectively.

The output signals of read amplifiers 250,252 and 254 each separately provide the sensed data containing the at least one constraint and any errors introduced into the sensed data during sensing. Each of the read amplifiers 250, 252 and 254 amplifies the signal and performs any other required signal processing and generates a first signal representative of data containing the at least one constraint from said predetermined storage locations and any errors introduced into the sensed data during sensing. Each of the read amplifiers 250, 252 and 254 applies its respective output as the first signal to parallel detectors.

Specifically, the first signal from read amplifier 254, which is a sum of two signals sensed by the MR elements, is applied as an input to a sum data extraction and error circuit 700 that produces an extracted data signal on output 710 representing the sum of the two signals sensed by the MR elements 176 and 178, and a control signal having information about the extent of errors which appears on output 720.

Similarly, the first signal from read amplifiers 250 and 252, which are the signals sensed by the MR elements 176 and 178, respectively, are applied as an input to a left data extraction and error circuit 702 for the sensed signal from MR element 176 and to a right data extraction and error circuit 704 for the sensed signal from MR element 178, respectively. The left data extraction and error circuit 702 produces an extracted data signal on output 712 extracted from the first signal from MR element 176 and a control signal having information about the extent of errors which appears on output 722.

The right data extraction and error circuit 704 produces an extracted data signal on output 714 extracted from the first signal from MR element 178 and a control signal having information about the extent of errors which appears on output 724.

In this embodiment, the sum data extraction and error circuit 700 generates a unified control signal while the left data extraction and error circuit 702 and the right data extraction and error circuit 704 each generate a control signal containing information about the extent of errors in each received signal.

In the embodiment of FIG. 11, the following two control functions are performed with respect to the extracted data signals 710, 712 and 714 and control signals 720, 722 and 724. The extracted data signals 710, 712 and 714 are applied as an input to a data multiplexor 732 which, in response to a processing control signal received via lead 736 from a selection controller 734, performs a derivative operation which is responsive to the processing control signal 736 and at least one of the extracted sum data signal 710, the extracted left data signal 712 and the right extracted data signal 714 to derive therefrom a data signal containing the least amount of errors.

The control signals 720, 722 and 724 are concurrently applied to the selection controller 723 and to a servo controller 724. The selection controller is responsive to the control signals to generate the processing control signal 736 applied to the data multiplexor 732 as described herein before.

The servo controller 723 generates position error signals from the control signals and applies the same via lead 726 to a servo amplifier 728. The servo amplifier 728 applies the servo signals representing the magnitude and direction of the adjustment required to improve alignment between the MR elements and data track 160.

The embodiment illustrated in FIG. 11 can perform either one or both of the derivation of data functions via the multiplexor 732 and using the control signals to generate a dynamic servo signal in the form of substantially continuous servo signals.

Figure 12:
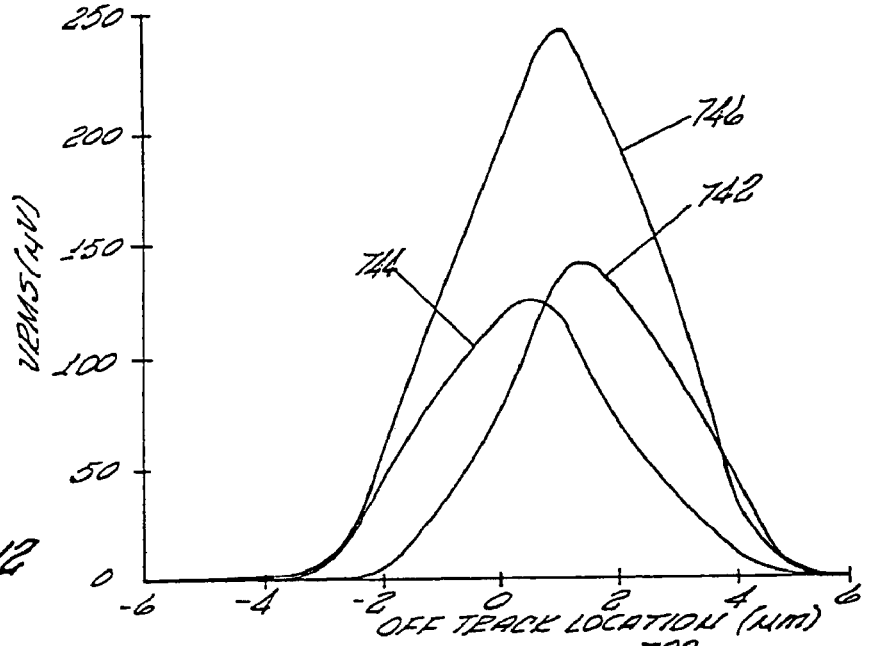
FIG. 12 is a plot of voltage from each MR element and the sum of voltages from both MR elements plotted as a function of off track locations showing the response curves representative of the inputs to the individual data extraction and error detection circuits shown in FIG. 11.

FIG. 12 is the voltage of the sensed signal from each MR element 176 and 178 and the sum of voltages from both MR elements 176 and 178 plotted as a function of off track locations. The response curve 742 is representative of MR element 176 and response curve 744 is representative of MR element 178. Response curve 746 represents the sum of the sensed signals from MR elements 176 and 178. These signals represent the first signal applied to the applicable input device or data extraction and error circuits illustrated in FIG. 11.

Figure 13:
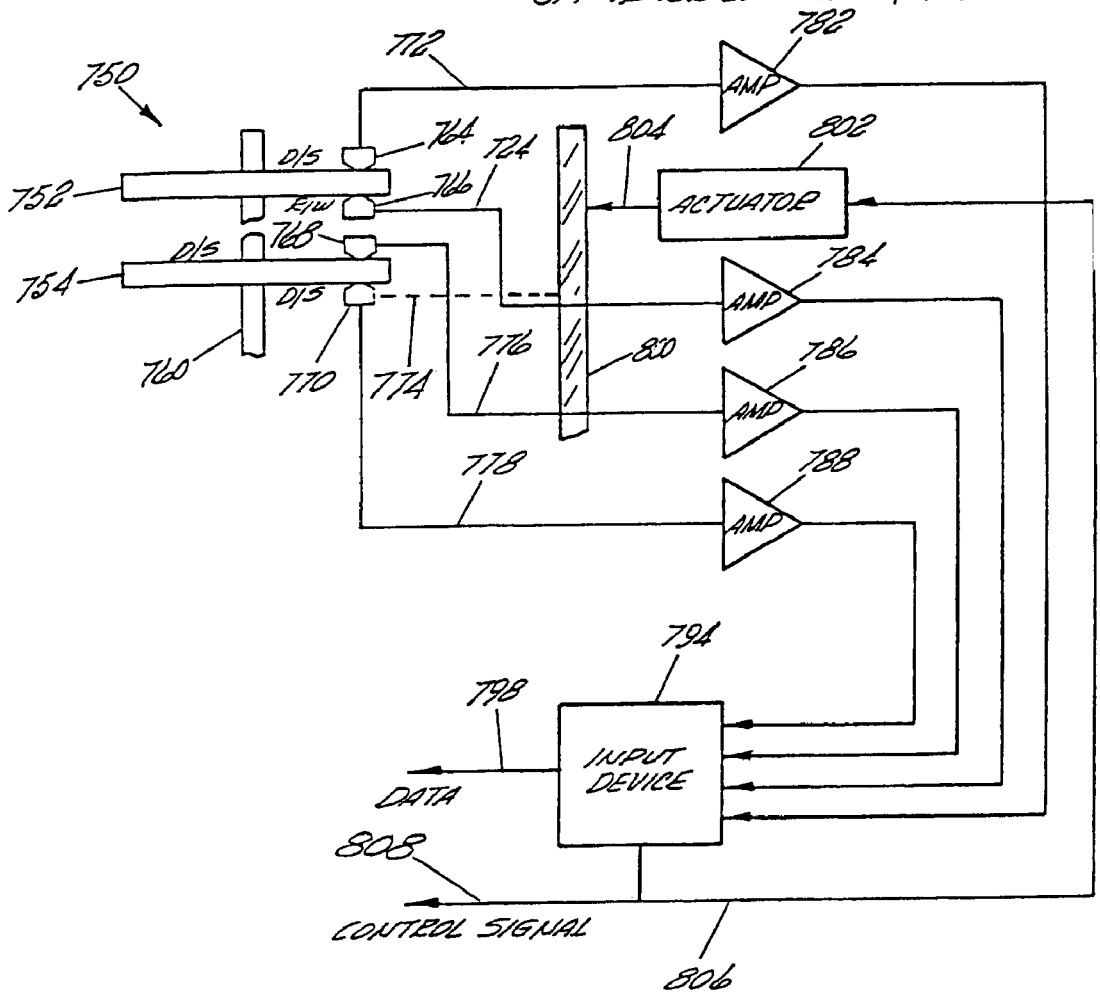
FIG. 13 is a diagrammatic representation of another embodiment of the present invention of a multidisc storage system having a first transducer and a second transducer for generating first signals from different disc surfaces as inputs to an input device for generating a plurality of control signals each containing different information about the extent of errors.

The multidisc storage system illustrated in the diagrammatic representation of the FIG. 13 is another embodiment of the present invention for generating a dynamic servo signal which is in the form of a substantially continuous servo signal which can be used to develop position error signals at a higher rate than the state-of-the-art storage system using the Servo Burst Method.

As illustrated in FIG. 13, disc drives 750 are currently being built which have plurality storage discs, discs 1 through N, as represented by discs 752 and 754. The discs are operatively connected to and adapted to be rotated by a spindle 760. A plurality of transducers 764, 766, 768 and 770 are supported by a support 800 and loading arms represented by dashed line 774 in operative relationship relative to the applicable disc surfaces of disc 752 and 754.

In FIG. 11, the disc surfaces may be an upper and lower surface on the same disc, e.g., disc 752, or disc surfaces on different discs, e.g., upper surface on disc 752 and upper surface on disc 754.

When the disc surfaces are on the same disc, physical conditions which introduce errors into the sensed signal, e.g., thermal expansion, bending or the like, affect both surfaces more or less equally thereby reducing errors between the transducers sensing data from surfaces on the same the rotating disc. When the disc surfaces are on different discs driven by a common spindle, physical conditions which introduce errors into the sensed signals, e.g., spindle wobble, affect both discs more or less equally thereby eliminating some errors between the transducers sensing data from surfaces on different rotating disc.

The transducers 764, 766, 768 and 770 sense the stored data and apply the sensed signals to their respective read amplifiers 782, 784, 786 and 788, respectively.

The outputs from each of the read amplifiers 782, 784, 786 and 788 are applied parallel to an input device 974 which derives a single extracted data signal therefrom which appears as output 798. The input device 794 generates a control signal containing information about the extent of errors from the plurality of first signals, and generates a dynamic servo signal which appear on lead 806. The control signal on lead 806 is applied to actuator 804 to adjust the position of one or more of the transducers 764, 766, 768 and 770 to improve transducer alignment relative to a track on the disc surface. The control signal shown in arrow 808 may be used in a manner similar to FIG. 12, being applied to a data multiplexor through a selection controller.

As illustrated in FIG. 13, the transducers that address or which are placed into operative relationship with all of the disc surfaces move together as a part of a single transducer stack assembly generally known in the art as head stack assembly. When one of the transducers on a first disc surface is well aligned with a track and is reading or sensing data from that track, the transducers on the other disc surfaces are approximately aligned with the tracks on those other disc surfaces.

As a result of the high manufacturing tolerances necessary to achieve current track densities, and of operating environmental conditions introducing thermal and other effects that cause the transducer to transducer alignment to vary over time, information about the position of a transducer on a second disc surface is not sufficient to accurately control the position of the transducer on the first surface so as to be able to align that transducer with the required accuracy over a track on the first disc surface.

The apparatus of FIG. 13 can be used to provide information about the extent of errors by processing signals sensed from one or more of the other disc surfaces in the same manner as has already been described for a first signal from a transducer sensing or reading data from the first surface. This information is used to detect relative movement between the head of the disc storing the data and to transmit this to the input device. The input device 794 uses this information in combination with the information received from the control signal containing information about the extent of errors in the first signal to improve the alignment of the first transducer relative to its data track.

Such additional information may be obtained from one or more of the other disc surfaces storing data in the disc drive. When the disc surfaces are on the same disc, the sensed data from the first transducer's reading is particularly useful, e.g., can be used to generate a single control signal to adjust both transducers to improve alignment of both transducers relative to its associated track. During manufacturing of a disc drive, a manufacturing step called "servowriting" is used in which servo burst are written for every track and every surface. It is envisioned as part of this invention to align tracks on opposite surfaces of the same discs, so that the track centers on the first surface are somewhat offset from the track centers on the second surface during servowriting. Thus, when a transducer on one surface is well aligned with a track on the first surface, the transducer on the opposite surface is somewhat misaligned with a track on the opposite surface. When this occurs, the relationship between the transducer and track on the opposite surface is such that the extent of errors is large.

As shown in FIGS. 7 and 8, the rate that the extent of errors (BER measured during PRML processing) changes by large amounts as the alignment of the transducer with the data track changes. Therefore, the second transducer will be operating in alignment with the second track such that the extent of errors is a very sensitive measure of the change in alignment between the transducer and track, increasing its usefulness as a second control signal applied to the control device 794.

It is also envisioned to write the servo burst on opposite surfaces of a disc so that the servo burst on one surface are positioned half-way between pairs of servo bursts on the other surface which can be easily accomplished during servowriting. As a result, information from the servo burst on the second surface can be provided to the control device 794 during the intervals between generation of information from servo burst on the first surface. These control signals may be used in the intervals between the servo burst signals to adjust transducer position relative to a track on a nearly continuous basis.

Summary

It is envisioned that the teachings of the apparatus, method and system as disclosed has application in storage systems in which the storage medium is moved in relation to the transducer, including magnetic disc drives, both hard and floppy disc application, in magnetic tape drives, magnetic card stripes or the like. Any storage apparatus which utilizes magnetic responses, including magnetic induction, magneto-resistive sensors, including "giant magnetoresistive" transducer, "colossal magnetoresistive" transducer and spin-valve transducer are deemed to be within the teaching of the present invention.

In addition, it is envisioned that the teachings hereof would have utility for storage systems employing electric and other forces as sensed by an appropriate probe such as is used in atomic force microscopes and other microscanning devices.

In addition, it is envisioned that the teaching hereof would have utility for optical data storage or other storage systems including holographic memories which record and reproduce stored data in predetermined storage locations.

All of the above are envisioned to be useful for practicing the invention as disclosed herein.

What is claimed is:

1. A data acquisition and recording system comprising:

a first transducer for detecting signals from a first storage medium embodying data to be acquired, the first transducer defining a first tracking relationship with respect to the first storage medium;

a second transducer for recording signals to a second storage medium, the second transducer defining a second tracking relationship with respect to the second storage medium, the first and second transducers having a fixed spatial relationship with respect to each other;

data recovery circuitry coupled to receive signals detected by the first transducer, the data recovery circuitry deriving recovered data from the detected signals, the data recovery circuitry deriving a measure of errors of the detected signals in relation to the recovered data in a substantially continuous manner, the measure being responsive to an accuracy of the first tracking relationship; and a servo controller coupled to the data recovery circuitry to receive the measure and generate a position error signal in response to the measure as the data recovery circuitry derives data from the detected signals, the position error signal being indicative of corrections determined for the first and second tracking relationships.

2. The system of claim 1, wherein the first and the second storage medium are a first and a second surface, respectively, of a data storage disc.

3. The system of claim 1, wherein the first and the second storage medium are a first and a second data storage disc, respectively.

4. The system of claim 1, further comprising an actuator for simultaneously adjusting the first and second tracking relationships while maintaining the fixed spatial relationship between the first and second transducers.

5. The system of claim 1, wherein a magnitude of the measure increases for sufficiently large positive and negative errors in the first tracking relationship and the measure has a same sign for both the positive and negative errors in the first tracking relationship.

6. The system of claim 1, wherein the signals detected by the first transducer are encoded with a constraint and the measure is derived from the detected signals in accordance with the constraint.

7. The system of claim 1, wherein the data recovery circuitry calculates the data and error data from the detected signals according to PRML decoding, the measure being derived from the calculated error data.

8. The system of claim 1, wherein the data recovery circuitry continuously derives the measure from portions of the detected signals including data.

9. The system of claim 1, wherein the first storage medium includes servo data structures interspersed within the signals embodying data, the servo data structures dedicated to servo operations, the servo data structures readable by the first transducer to provide servo information about the first tracking relationship, the servo controller adjusting the first and second tracking relationships in response to the servo information at predetermined intervals during data acquisition and recording.

10. A data acquisition and recording system, comprising:

a read head for reading a signal representative of data from a first data storage surface, the read head defining a first relative positional relationship with respect to first data storage structures on the first data storage surface;

a write head for recording data on a second data storage surface, the write head defining a second relative positional relationship with respect to second data storage structures on the second data storage surface, the read head and the write head having a fixed spatial relationship relative to each other;

data processing circuitry coupled to receive signals detected by the read head, the data processing circuitry deriving data from the detected signals and generating a measure of errors in the detected signals relative to the derived data, the measure varying with misalignments in the first relative positional relationship in a predetermined manner; and a servo control system for maintaining the first and second relative positional relationships, the servo control system receiving the measure of errors and generating a position error signal for adjusting positions of the read head and the write head, the position error signal being generated in response to the measure of error while the data processing circuitry derives data from the detected signals.

11. The system of claim 10, wherein the first and the second data storage surface are a first and a second data storage surface, respectively, of a data storage disc.

12. The system of claim 10, wherein the first and the second data storage surface are a surface of a first data storage disc and a surface of a second data storage disc, respectively.

13. The system of claim 10, further comprising an actuator for simultaneously adjusting the first and second relative positional relationship while maintaining the fixed spatial relationship between the read head and the write head.

14. The system of claim 10, wherein a magnitude of the measure increases for sufficiently large misalignments between the read head and the first data storage structure in either of two opposite directions and the measure has a same sign for sufficiently large misalignments in either of the opposite directions.

15. The system of claim 14, wherein the measure is a bit error rate.

16. The system of claim 10, wherein the detected signals are encoded with a constraint and the measure is derived from the detected signals in accordance with the constraint.

17. The system of claim 16, wherein the data processing circuitry decodes the detected signals to derive the data in accordance with a partial response, maximum likelihood methodology.

18. The system of claim 10, wherein the data processing circuitry processes the detected signals in accordance with partial response maximum likelihood (PRML) data processing to derive both the data and errors between the detected signals and the recovered data, the measure being derived from the derived errors.

19. The system of claim 10, wherein the first data storage structure includes plural servo data structures interspersed with the signals embodying data, the servo data structures primarily dedicated to servo operations, the servo data structures readable by the read head and providing servo information about the first relative positional relationship between the read head and the first data storage structure, the control system receiving the servo information and adjusting the first relative positional relationship between the read head and the first data storage structure and the second relative positional relationship between the write head and the second data storage structure in response to the servo information at predetermined intervals during data acquisition and recording.

20. The system of claim 10, wherein the read head includes magnetoresistive elements.

21. The system of claim 20, wherein the data storage structure is a track on a magnetic storage disk.

22. The system of claim 10, wherein the read head and the write head include integral read and write elements.

23. A data acquisition and recording system comprising:

a first transducer for detecting signals from a first storage medium embodying data to be acquired, the first transducer defining a first tracking relationship with respect to the first storage medium;

a second transducer for recording signals to a second storage medium, the second transducer defining a second tracking relationship with respect to the second storage medium, the first and second transducers having a defined spatial relationship relative to each other;

data recovery circuitry coupled to receive signals detected by the first transducer, the data recovery circuitry deriving recovered data from the detected signals, the data recovery circuitry deriving a measure of errors of the detected signals in relation to the recovered data in a substantially continuous manner, the measure being responsive to an accuracy of the first tracking relationship; and a servo controller coupled to the data recovery circuitry to receive the measure and generate a position error signal in response to the measure, the position error signal having a magnitude representing a magnitude of a correction to be made to adjust the first and second tracking relationships.

24. A data acquisition and recording system, comprising:

a read head for reading a signal representative of data from a first data storage surface, the read head defining a first relative positional relationship with respect to first data storage structures on the first data storage surface;

a write head for recording data on a second data storage surface, the write head defining a second relative positional relationship with respect to second data storage structures on the second data storage surface, the read head and the write head having a fixed spatial relationship relative to each other;

data processing circuitry coupled to receive signals detected by the read head from the first data storage surface, the data processing circuitry deriving data from the detected signals and generating a measure of errors in the detected signals relative to the derived data, the measure varying with misalignments in the first relative positional relationship between the read head and the first data storage structure in a predetermined manner; and a servo control system for maintaining the first and second relative positional relationships, the servo control system receiving the measure of errors and generating a position error signal in response to the measure of errors for adjusting positions of the read head and the write head, the position error signal having a magnitude representing a magnitude of the adjustment of position of the read head.

25. Apparatus for extracting and recording data signals comprising:

a first transducer for sensing a first storage medium and generating a first signal representative of data containing at least one constraint from the first storage medium and any errors in the sensed data identified using the at least one constraint, the first transducer defining a first tracking relationship with respect to the first storage medium;

a second transducer for recording data on a second storage medium, the second transducer defining a second tracking relationship with respect to the second storage medium, the first and second transducers having a defined spatial relationship relative to each other;

an input device responsive to the first signal for generating a control signal containing information about the errors in the sensed data and for extracting a data signal; and an output device operatively coupled to the input device for receiving the control signal and for performing a control function in response thereto to improve an accuracy of the first and second tracking relationships as a function of an extent of errors in the sensed data, the control function being performed as the first transducer generates the first signal.

26. Apparatus for extracting and recording data signals comprising:

a first transducer for sensing a first storage medium and generating a first signal representative of data containing at least one constraint from the first storage medium and any errors in the sensed data identified using the at least one constraint, the first transducer defining a first tracking relationship with respect to the first storage medium;

a second transducer for recording data on a second storage medium, the second transducer defining a second tracking relationship with respect to the second storage medium, the first and second transducers having a fixed spatial relationship relative to each other;

an input device responsive to the first signal for generating a control signal containing information about the errors in the sensed data and for extracting a data signal; and an output device operatively coupled to the input device for receiving the control signal and for performing a control function in response thereto to improve an accuracy of the first and second tracking relationships as a function of an extent of errors in the sensed data wherein the output device is responsive to the control signal to produce a dynamic servo signal to improve an accuracy of the first and second tracking relationships, and wherein the dynamic servo signal is substantially continuously supplied.

27. Apparatus for extracting and recording data signals comprising:

a first transducer for sensing a first storage medium and generating a first signal representative of data containing at least one constraint from the first storage medium and any errors in the sensed data identified using the at least one constraint, the first transducer defining a first tracking relationship with respect to the first storage medium;

a second transducer for recording data on a second storage medium, the second transducer defining a second tracking relationship with respect to the second storage medium, the first and second transducers having a fixed spatial relationship relative to each other;

an input device responsive to the first signal for generating a control signal containing information about the errors in the sensed data and for extracting a data signal; and an output device operatively coupled to the input device for receiving the control signal and for performing a control function in response thereto to improve an accuracy of the first and second tracking relationships as a function of an extent of errors in the sensed data, wherein the first transducer includes a magnetoresistive element, the first storage medium has storage locations including a track having a center line, the magnetoresistive element is positioned at a slight offset from the center line of the track in a known direction establishing a predetermined sensor offset, the output device is responsive to the control signal to generate a position error signal representing the magnitude and direction in which the first and second transducers are to be moved to improve magnetoresistive element alignment relative to the track.

28. A method for reading and writing data in a storage system comprising:

positioning a read element with respect to a first storage medium storing data to be sensed;

positioning a write element with respect to a second storage medium for writing data, the write element and the read element having a predefined spatial relationship with respect to each other;

sensing the first storage medium with the read element to generate a first signal representative of stored data containing at least one constraint and errors introduced during the sensing;

from the first signal, extracting a data signal and generating a control signal containing information about an extent of errors in the first signal;

determining a direction of a position error correction from the first signal; and based on the control signal and the direction of the position error correction, simultaneously adjusting the positions of the read and write elements with respect to the first and second storage media, respectively, while maintaining the redefined spatial relationship between the read and write elements.

29. A method for using information about an extent of errors in a storage system comprising:

positioning a first transducer for sensing data from first storage locations having stored data containing at least one constraint;

positioning a second transducer for writing data to second storage locations;

producing from the first transducer a first signal representative of the sensed data containing the at least one constraint from the first storage locations and information about errors in the sensed data;

generating in response to the first signal a control signal containing information about the extent of errors in the sensed data;

extracting from the first signal a data signal; and receiving the control signal and performing a control function in response thereto to reduce a position error of the first transducer by an amount determined by the extent of errors in the sensed data and simultaneously to reduce a position error of the second transducer, the control function being performed as the first signal is produced.

30. The method of claim 29 further comprising producing in response to the first signal a direction and magnitude of a servo signal and using the direction and magnitude of the servo signal to improve alignment of the first and second transducers relative to the first and second storage locations.

31. The method of claim 29 wherein the process of receiving produces in response to the control signal a dynamic servo signal in the form of a substantially continuous servo signal indicative of misalignment of the first transducer relative to first storage locations.

32. The method of claim 29 wherein the control function adjusts the transducer position in a direction to improve first transducer alignment relative to the storage locations.

33. The method of claim 29 wherein the process of generating includes:

comparing the extracted data signal containing at least one constraint with an expected data signal containing at least one constraint; and generating in response thereto the control signal.

34. The method of claim 29 wherein the storage locations are tracks on a rotatable magnetic medium and data are sensed by a magnetic transducer and wherein a servo system is operatively coupled to the magnetic transducer for receiving and responding to the control signal for adjusting the magnetic transducer in a direction to position the transducer in alignment relative to the tracks on the magnetic medium.

*35. A method comprising:*

*(a) detecting both stored data and at least two servo bursts, the stored data including at least one constraint; and*

*(b) sensing additional data via a transducer while positioning the transducer at least partly based on both a data-error-indicative quantity derived from the stored data and a position-error-indicative quantity derived from the servo bursts.*

*36. The method as recited in claim 35 further comprising writing the servo bursts onto a data storage disc.*

*37. The method as recited in claim 35 further comprising writing the stored data with a Run Length Limited (RLL) code as the at least one constraint.*

*38. The method as recited in claim 35 further comprising writing the stored data with a bit encoding comprising the at least one constraint.*

*39. The method as recited in claim 35 further comprising writing the stored data with an error correction code comprising the at least one constraint.*

*40. The method as recited in claim 35 further comprising writing the stored data with the at least one constraint comprising a data formatting.*

*41. The method as recited in claim 35 wherein the sensing (b) includes computing a bit error rate as the data-error-indicative quantity.*

*42. The method as recited in claim 35 wherein the sensing (b) includes calculating as the data error-indicative quantity a measure having one predetermined sign for a sufficiently large transducer misalignment in either of two opposite directions.*

*43. The method as recited in claim 35 wherein the sensing (b) includes deriving the data-error-indicative quantity at least partly based on an output from a partial response, maximum likelihood (PRML) decoder.*

*44. The method as recited in claim 35 wherein the sensing (b) includes deriving the data-error-indicative quantity by generating a weighted average of at least two data signals.*

*45. The method as recited in claim 35 wherein some of the stored data is detected after detecting any servo burst.*

*46. A data handling system comprising:*

*at least one transducer configured to sense from a first data storage surface both stored data and*

*at least two servo bursts, the stored data including at least one constraint; and*

*at least one actuator configured to position the transducer (s) at least partly based on both a data-error-indicative quantity derived from the stored data and a position-error-indicative quantity derived from the at least two servo bursts.*

*47. The data handling system as recited in claim 46 further comprising a device configured to derive the data-error-indicative quantity from the at least one constraint.*

*48. The data handling system as recited in claim 46 further comprising an assembly configured to position the transducer and at least one write head over the first data storage surface.*

*49. The data handling system as recited in claim 46 wherein the at least one transducer includes at least one magnetoresistive element.*

*50. The data handling system as recited in claim 46 further comprising circuitry configured to derive recovered data from the sensed stored data in a substantially continuous manner.*

*51. The data handling system as recited in claim 50 further comprising a servo controller configured to generate a position control signal at least partly based on data received from the circuitry.*

*52. The data handling system as recited in claim 46 wherein the transducer is responsive to read track widths of less than 20 microinches.*

*53. The data handling system as recited in claim 46 wherein the first data storage surface is on a magnetic disc.*

* * * * *